United States Patent
Perry et al.

(10) Patent No.: US 7,654,082 B2
(45) Date of Patent: Feb. 2, 2010

(54) SYSTEM OF UNDERWATER POWER GENERATION

(75) Inventors: Michael David Perry, Lawrence (AU); Duncan Bartlett Gilmore, Samford (AU); Raymond Lindsay Hope, Wishart (AU); Gary James Campbell, Point Clane (AU); Melissa Louise Kruger, Kenmore (AU); Carmen Patricia Keating, Kongaroo Point (AU)

(73) Assignee: Atlantis Resources Corporation PTE Limited, Singapore (SG)

( * ) Notice: Subject to any disclaimer, the term of this patent is extended or adjusted under 35 U.S.C. 154(b) by 232 days.

(21) Appl. No.: 11/376,891

(22) Filed: Mar. 16, 2006

(65) Prior Publication Data

US 2006/0192389 A1  Aug. 31, 2006

Related U.S. Application Data

(63) Continuation of application No. PCT/AU2004/001281, filed on Sep. 20, 2004.

(30) Foreign Application Priority Data

| Sep. 19, 2003 | (AU) | ............................... 2003905107 |
| Nov. 27, 2003 | (AU) | ............................... 2003906557 |
| Mar. 26, 2004 | (AU) | ............................... 2004901628 |
| Jun. 1, 2004 | (AU) | ............................... 2004902885 |

(51) Int. Cl.
*F16D 31/02* (2006.01)

(52) U.S. Cl. .................. 60/398; 415/5; 416/7

(58) Field of Classification Search .................. 60/398; 415/5; 416/7

See application file for complete search history.

(56) References Cited

U.S. PATENT DOCUMENTS

| 742,529 | A | * | 10/1903 | Trenchard et al. | ............... 416/7 |
| 1,237,868 | A | * | 8/1917 | Clarkson | ........................ 415/5 |
| 4,163,904 | A | | 8/1979 | Skendrovic | |
| 4,313,059 | A | | 1/1982 | Howard | |
| 4,335,319 | A | | 6/1982 | Mettersheimer, Jr. | |
| 4,383,182 | A | | 5/1983 | Bowley | |
| 4,589,344 | A | * | 5/1986 | Davison | ...................... 290/44 |
| 5,440,176 | A | | 8/1995 | Haining | |
| 6,109,863 | A | | 8/2000 | Milliken | |
| 7,075,191 | B2 | * | 7/2006 | Davison | ...................... 290/54 |

FOREIGN PATENT DOCUMENTS

| DE | 20312364 | 10/2003 |
| FR | 2474106 | 7/1981 |
| FR | 2 534 966 | 10/1982 |
| GB | 2 201 469 | 9/1988 |
| GB | 2214239 | 8/1989 |

* cited by examiner

*Primary Examiner*—F. Daniel Lopez
(74) *Attorney, Agent, or Firm*—Morgan, Lewis & Bockius LLP

(57) ABSTRACT

An underwater power generation system (10) that has a line member (30) that moves along a defined pathway. A number of foils (40) drive the line member using the flow of a water current. The defined pathway lies in a plane that is substantially perpendicular to the flow of water current. A power take-off (114, 124) is connected to the line to produce power.

19 Claims, 19 Drawing Sheets

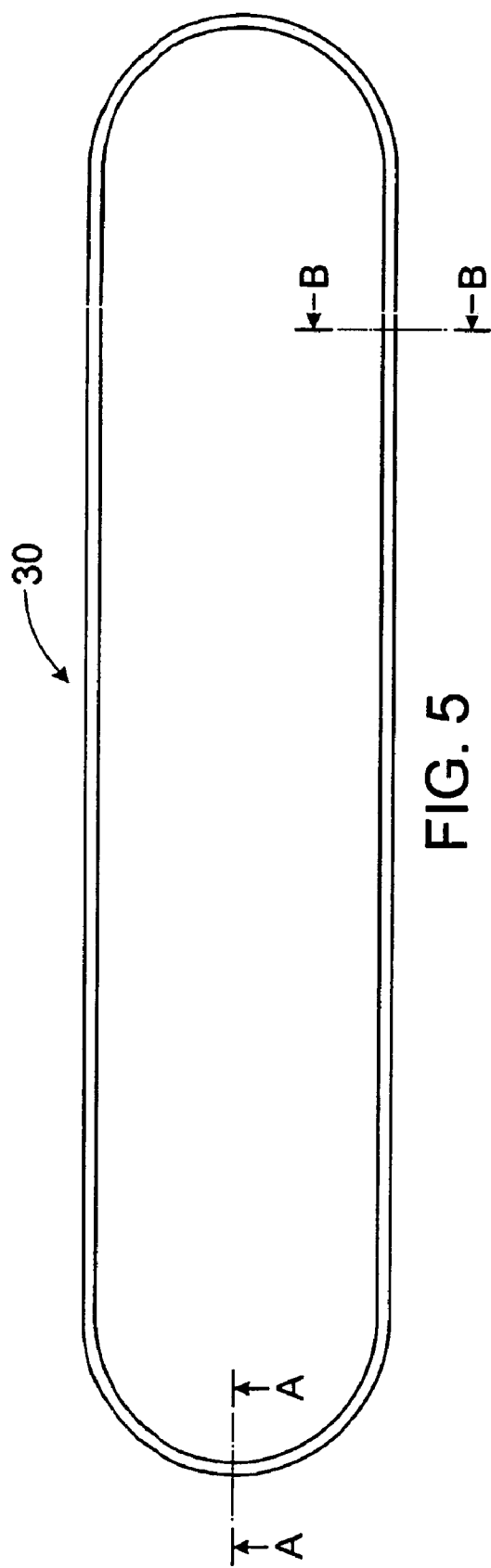
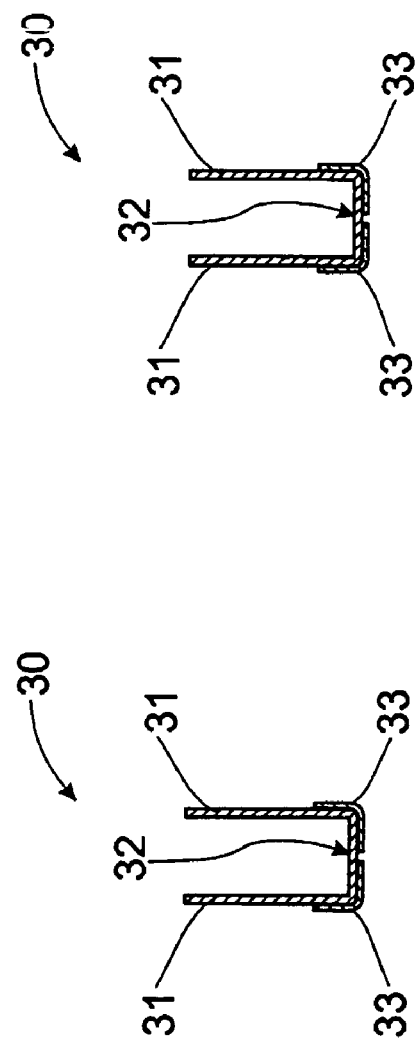

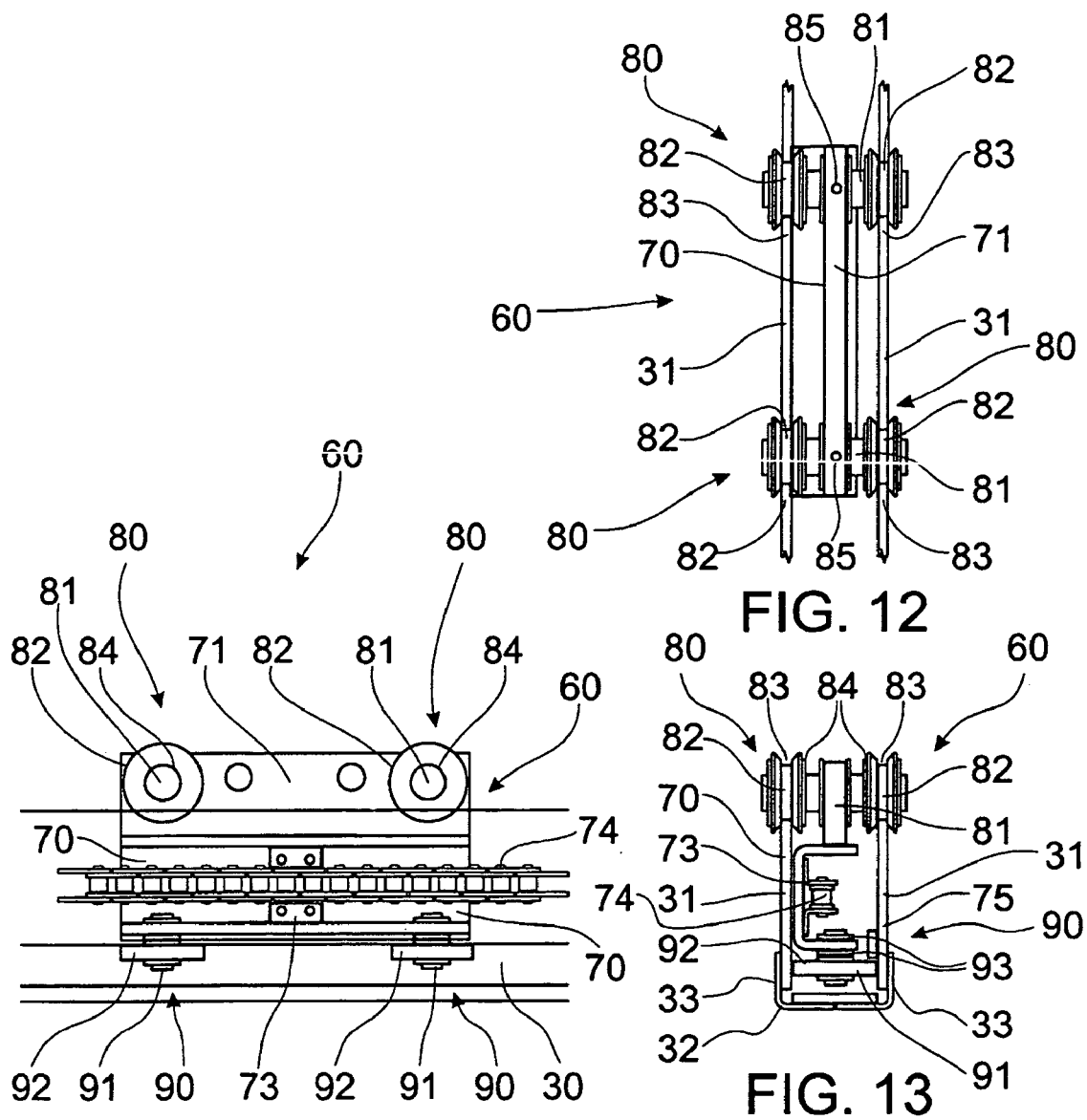
FIG. 12
FIG. 11
FIG. 13
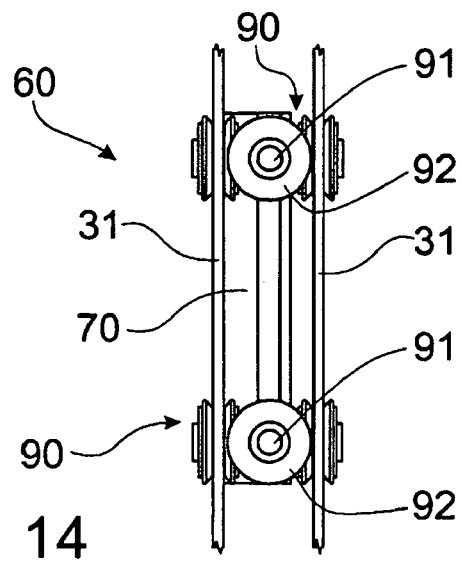
FIG. 14

SYSTEM OF UNDERWATER POWER GENERATION

RELATED APPLICATIONS

This application is a Continuation of PCT application serial number PCT/AU2004/001281 filed on Sep. 20, 2004 which in turn claims priority to Australian application serial number AU2003905107 filed on Sep. 19, 2003, Australian application serial number AU2003906557 filed on Nov. 27, 2003, Australian application serial number AU2004901628 filed on Mar. 26, 2004, and Australian application serial number AU2004902885 filed on Jun. 1, 2004, all of which are incorporated by reference herein in their entirety.

FIELD OF THE INVENTION

The invention relates to a system of underwater power generation.

In particular, although not exclusively, the invention relates to a system of converting the kinetic energy of moving water to electrical energy.

BACKGROUND OF THE INVENTION

Clean power generation has become a major concern due to the effects of global warming. Renewable clean power generation has been developed using solar cells, wind turbines and wave turbines. However, an effective renewable power generation system has yet to be developed using ocean currents.

U.S. Pat. No. 4,383,182 discloses an apparatus for generating power from ocean currents. The apparatus is winged and is anchored to the ocean floor. A number of propellers are attached to the wing and are rotated by the ocean current. The rotation of the propellers causes rotation of a generator to generate electricity. The problem with this apparatus is that the apparatus is not easily moved to cater for changes in the direction of ocean currents. Further, the generation of energy is dependant upon the size and number of propellers to catch a specific area of current flow.

U.S. Pat. No. 4,163,904 discloses an underwater turbine plant for generating electrical power using ocean currents. The turbine is driven by the flow of the water current across the blades of the turbine. Again, the level of electricity generated is proportional to the area of water that the turbine plant is able to capture.

U.S. Pat. No. 4,335,319 discloses a hydroelectric power apparatus that includes a powerhouse containing a power generator above the powerhouse located above the surface of the water. A hydraulic turbine is lowered from the powerhouse when the ocean currents are sufficient to drive the turbine. The disadvantage with this apparatus is that power is required to extend and retract the turbine. Further, the ocean current area that is utilised is equivalent to the inlet area of the turbine.

U.S. Pat. No. 5,440,176 discloses a hydroelectric power plant similar to that of U.S. Pat. No. 4,335,319 in that a series of turbines are extended and retracted dependant upon the velocity of the ocean currents.

Similar disadvantages exist with the power plant disclosed in U.S. Pat. No. 5,440,176 as with the apparatus disclosed in U.S. Pat. No. 4,335,319.

U.S. Pat. No. 6,109,863 discloses a fully submersible apparatus for generating electricity. The apparatus includes a buoyant structure having a motor mounted thereto. A series of vanes are connected to the motor. The vanes are rotated by the ocean current to cause electricity to be generated. A disadvantage with this apparatus is that the generation of electricity is dependant upon the area of current that the vanes are able to capture.

U.S. Pat. No. 4,313,059 discloses a system for generating electricity from ocean currents. The system uses two drags that are connected to opposite ends of a cable. The middle of the cable is wrapped around a generator. The drags are lowered into the ocean and moved from a drag position to a non drag position to reciprocate movement of the cable. The disadvantage with this system is that the generator must be able to generate energy when rotated in both directions. Further, the energy supply is not constant as the generator is constantly changing directions.

GB Patent Application 2,214,239A discloses an apparatus for harnessing power from natural fluid flows. The apparatus includes a continuous belt having a number of vanes. The continuous belt encircles a pair of cylinders that are operatively connected to drive a generator. The continuous belt is orientated so that water flow across the vanes to drive the belt and hence rotate the cylinders. The problem with this apparatus is that water flows through a front set of vanes and then through a rear set of vanes on the continuous belt. This creates water turbulence in water that passes through the rear set of vanes and hence efficiency of the apparatus is reduced.

SUMMARY OF THE INVENTION

It is an object of the invention to overcome or alleviate at least one or more of the above disadvantages or provide the consumer with a useful or commercial choice.

In one form, although it need not be the only or indeed the broadest form, the invention resides in an underwater power generation system comprising: at least one line member moveable along a defined pathway; a plurality of foils attached to said line member; and at least one power take-off operatively connected to said line member; the foils cause the line member to be moved along the defined pathway due to a flow of water current; wherein the defined pathway lies in a plane that is substantially perpendicular to flow of water current.

The define pathway may be defined by a track, pair of wheels, plurality of pulleys or the like.

The line member may be a cable, belt, chain or the like continuous member.

The power take-off may be operatively connected to a pump or generator or the like device.

Further features of the present invention will become apparent from the following detailed description.

BRIEF DESCRIPTION OF THE DRAWINGS

To assist in understanding the invention and to enable a person skilled in the art to put the invention into practical an embodiment of the invention will be described by way of example only with reference to the accompanying drawings, wherein:

FIG. 5 shows a top view of a track shown in FIG. 1;

FIG. 6 shows a cross-sectional view of the track along the line A-A;

FIG. 7 shows a cross-sectional view of the track along the line B-B;

FIG. 11 shows a front view of a foil carriage assembly;

FIG. 12 shows a top view of the foil carriage assembly of FIG. 11;

FIG. 13 shows a side view of the foil carriage assembly of FIG. 11;

FIG. 14 shows a bottom view of the foil carriage assembly of FIG. 11;

DETAILED DESCRIPTION OF THE PREFERRED EMBODIMENTS

Figure 3:
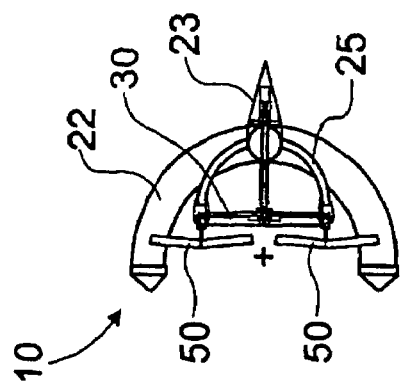
FIG. 3 shows a side sectional view of the underwater power generation system of FIG. 1.
Figure 4:
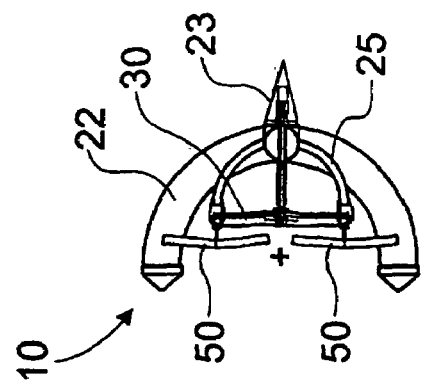
FIG. 4 shows a side sectional view of the underwater power generation system of FIG. 1.
Figure 1:
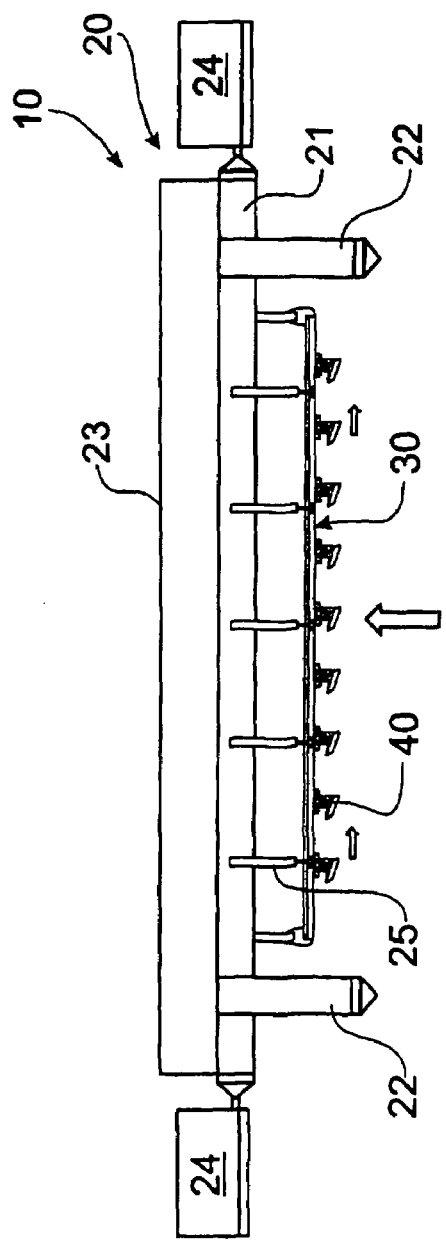
FIG. 1 shows a top view of an underwater power generation system according to a first embodiment of the present invention.
Figure 2:
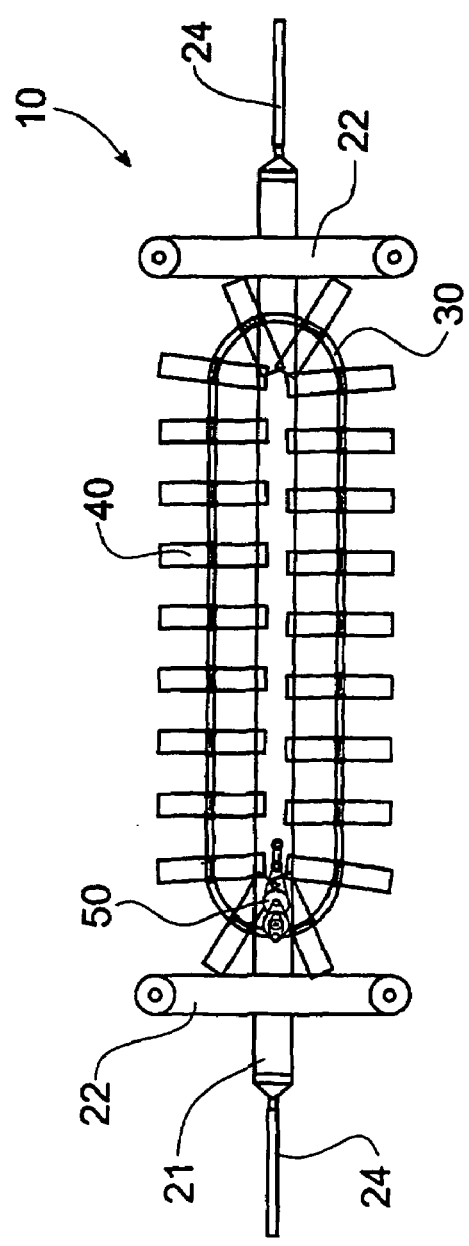
FIG. 2 shows front view of two drive units forming part of the underwater power generation system of FIG. 1.

FIGS. 1 to 4 show an underwater power generation system 10 that uses water currents to produce electricity. The underwater power generation system 10 includes a frame 20, a track 30, a plurality of foils 40 and a power take-off 50.

The frame 20 is formed from a main cylindrical body 21 with two arcuate attachment arms 22. Main cylindrical body 21 is hollow and has a centre fin 23 that extends rearwardly from the main cylindrical body 21. Side fins 24 are located at the sides of the main cylindrical body 21.

The arcuate arms 22 are used to hold the underwater power generation system 10. Cables (not shown) are attached to ends of each of the arcuate arms 22 and are anchored to an ocean or river floor to hold the underwater power generation system in position. Alternatively, the cables are mounted to a bridge, boat, or the like structure.

Figure 17:
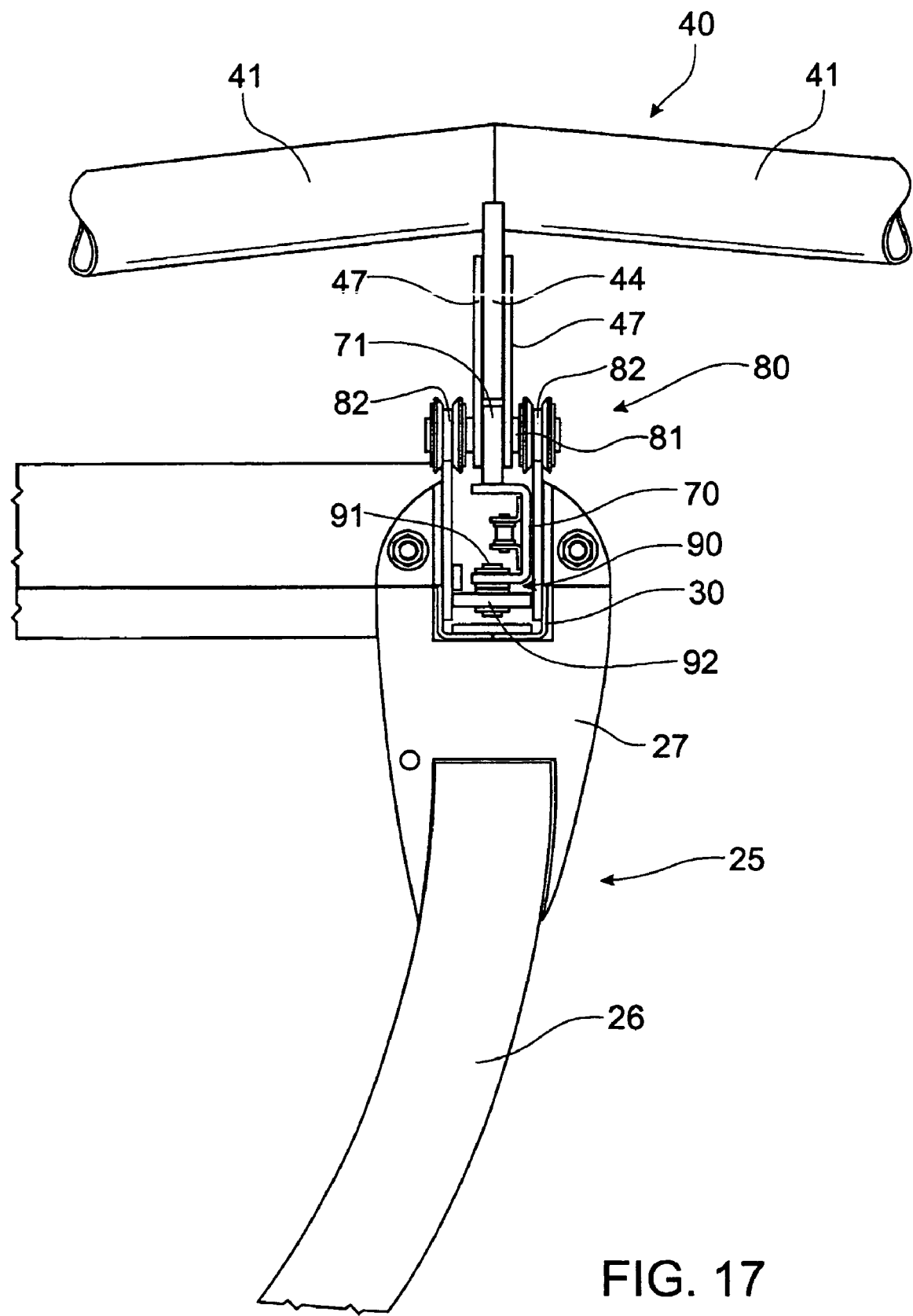
FIG. 17 shows a detailed side section view of the underwater power generation system.

Track support members 25 are attached and extend outwardly from the main cylindrical body 21. The track support members 25 are used to mount the track 30. Each track support member 25 is formed from a track arm 26 and a track cradle 27, details of which are shown in FIG. 17. Two bolt holes 28 are located through the cradle to attach the track to the cradle 27.

The track 30, shown in more detail in FIGS. 5 to 7, is oval in shape.

The track 30 is formed from two side track plates 31, a bottom track plate 32 and two L-shaped joining plates 33. The track 30, in transverse cross-section, is a rectangular-shaped channel.

Each of the foils 40 is formed from two wings 41, shown in FIG. 17, and a connection arm 42. The two wings 41 are rearwardly splayed with respect to each other and are inclined downwardly with respect to the connection arm 42. The wings 41 are formed from fiber-glass and are of a tear-drop shape when viewed in transverse cross-section.

Figure 8:
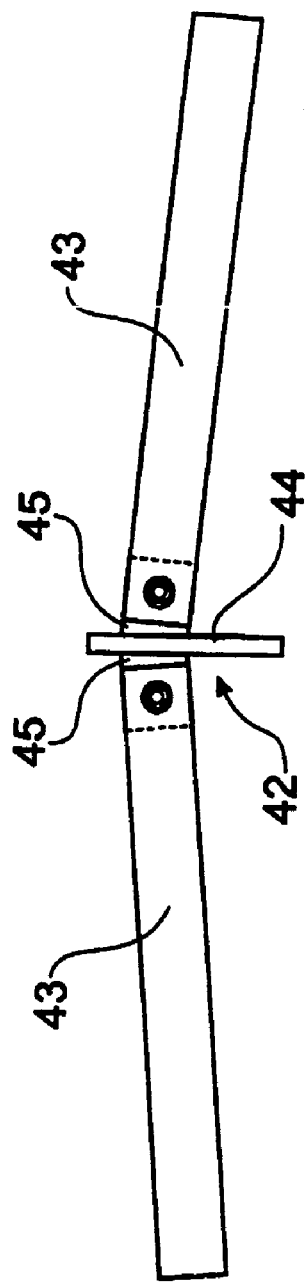
FIG. 8 shows a top view of a wing reinforcement plate and a connection arm.
Figure 9:
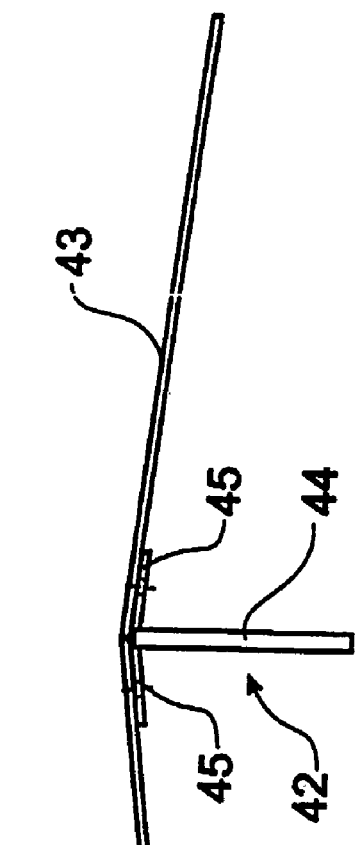
FIG. 9 shows a front view of the wing reinforcement plate and a connection arm shown in FIG. 8.
Figure 10:
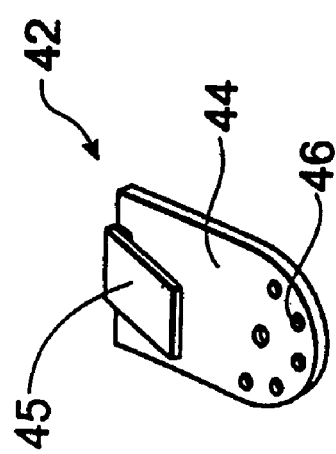
FIG. 10 shows a side view of the connection arm of FIG. 8.

Each wing has a wing reinforcement plate 43, shown in FIGS. 8 and 9, that extends through the centre of the wing 41. The foil connection arm 42, shown in FIGS. 8, 9 and 10, is formed from a foil connection 44 plate and two inclined connection wing plates 45. The connection wing plates 45 are used to mount respective reinforcement plates 45. Fiberglass is moulded around the reinforcement plates 43, connection wing plates 45 and the top of the foil connection plate 44 to produce the foil and associated wings. A series of holes 46 are located through the foil connection plate 44. The holes 46 are used to mount the foil at a desired angle with respect to foil carriage assembly 60.

The foil carriage assembly 60, shown in detail in FIGS. 11 to 14, is formed from a chain support member 70, two top wheel assemblies 80 and two bottom wheel assemblies 90. The chain support member 70 is formed from a C-shaped channel. A carriage connection plate 71 is attached to and extends upwardly from the chain support member 70

Each of the top wheel assemblies 80 is formed from a top shaft 81 having two top wheels 82 mounted for rotation adjacent opposite ends of the top shaft 81. Each of the top wheels 82 has a wheel channel 83 located within the top wheel. Washers 84 are located between the top wheels 82 and the top shaft 81. The carriage connection plate 71 is used to mount each top shaft. Each top shaft is pivotally mounted to the carriage connection plate 71 via an attachment pin 85.

Each of the bottom wheel assemblies 90 are formed from a bottom shaft 91 having a bottom wheel 92 mounted for rotation adjacent the end of the bottom shaft. The bottom wheel 92 is a flat wheel. The chain support member 70 is used to mount the bottom shaft 92. Washers 93 are located between the bottom wheels 92 and the bottom shaft 91, and the bottom shaft 92 and the chain support member 70.

A chain mounting member 73 is connected to the chain support member 70. The chain support member is connected to a drive chain 74. The drive chain 74 extends the periphery of the track 30.

Figure 18:
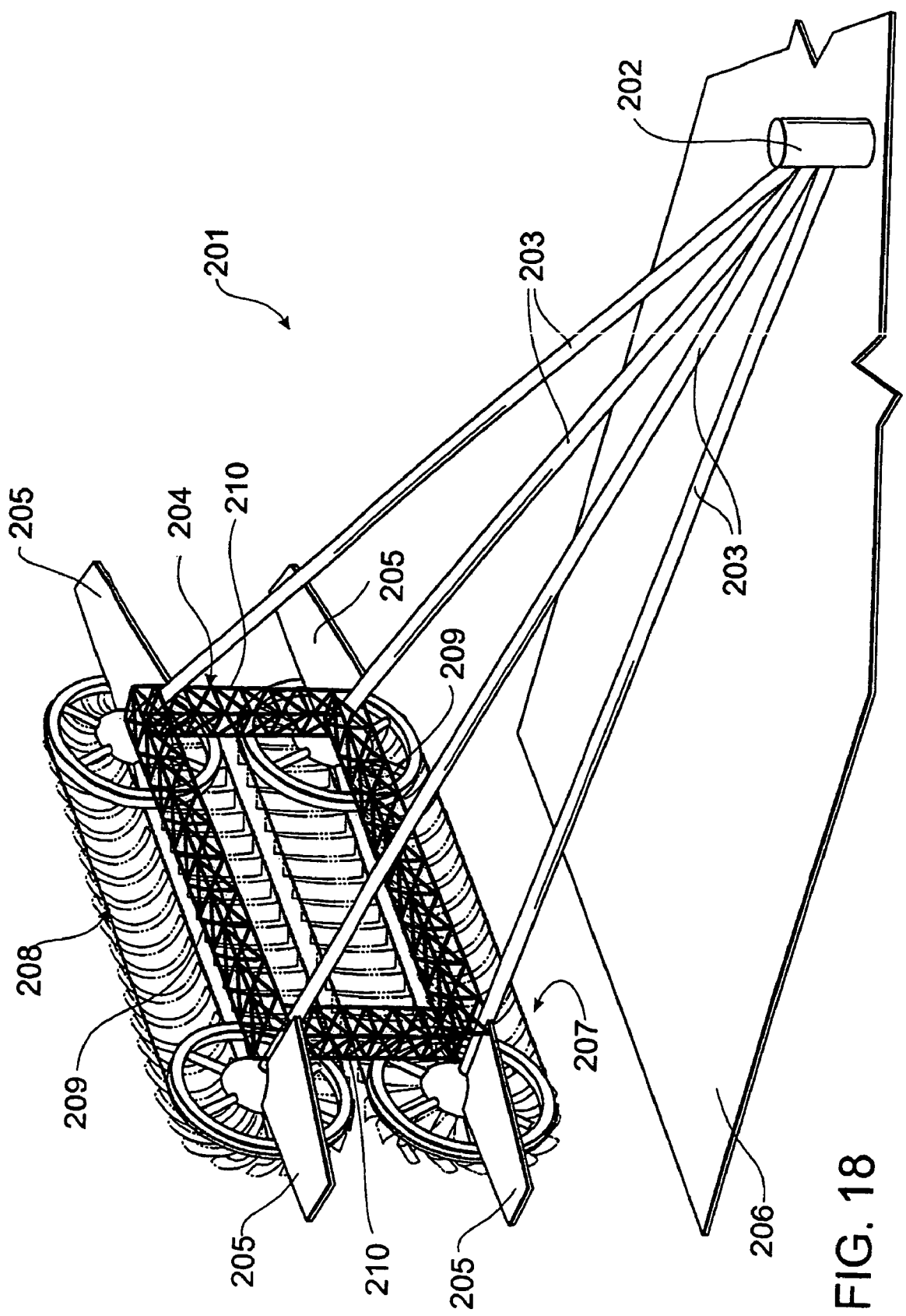
FIG. 18 shows a perspective view of an underwater power generation system according to a second embodiment of the present invention.

In use, the wheel channels of the top wheels are placed on top of the side track plates 31 to allow the foil carriage assembly 60 to run along the top of the channel 30. The bottom wheels 92 run smoothly along the inside of the channel 30. The bottom wheels 92 are held within the channel by a lubricating strip 75 and prevent the top wheels from becoming derailed from the channel 30. The top shafts 81 pivot as the foil carriage assembly 60 moves around the arcuate section of the track 30. FIG. 18 shows the shafts 81 pivoting as the foil carriage assembly 60 moves around the arcuate sections of the track 30.

Figure 15:
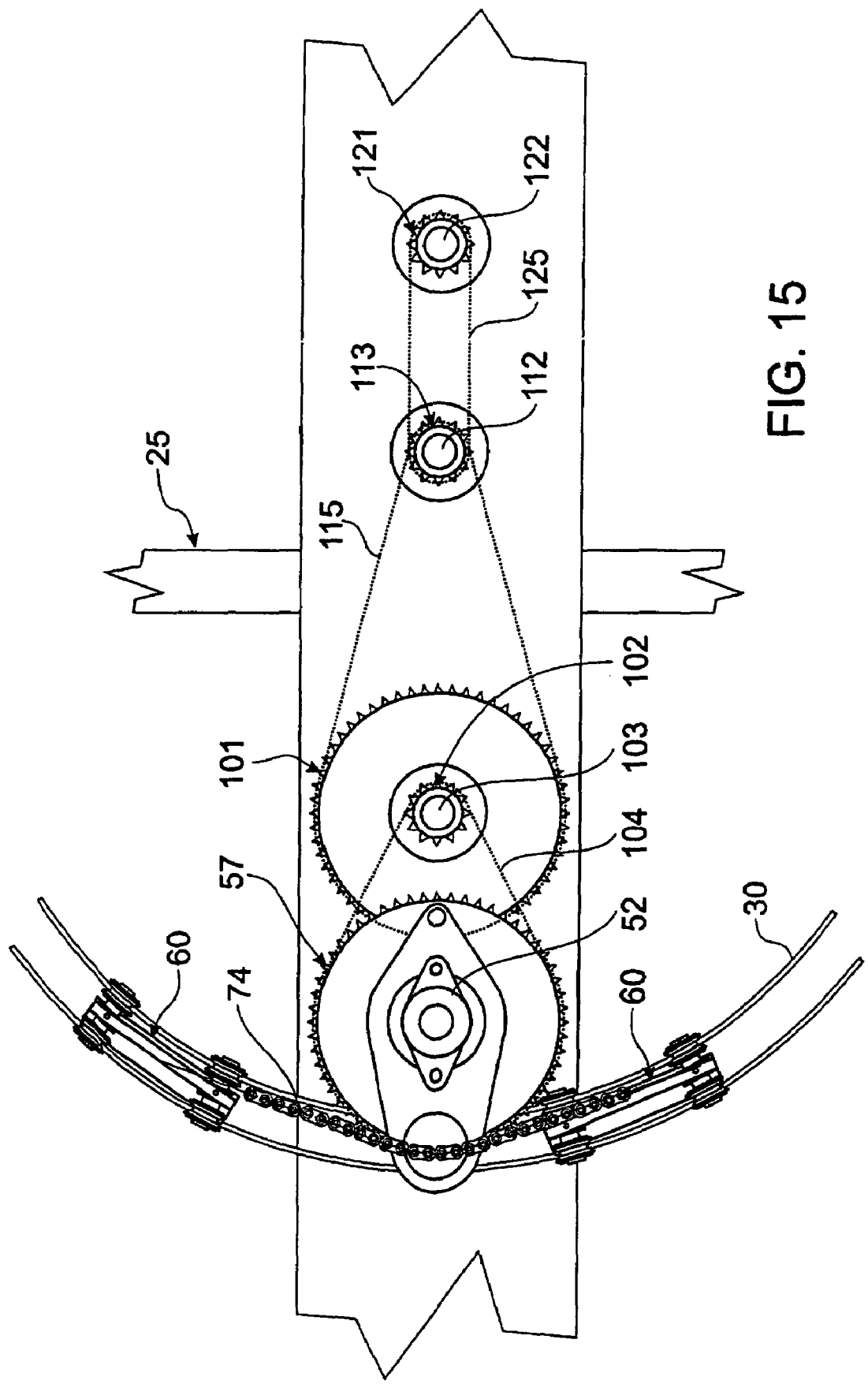
FIG. 15 shows a front detailed view of the power take-off of the underwater power generation system.
Figure 16:
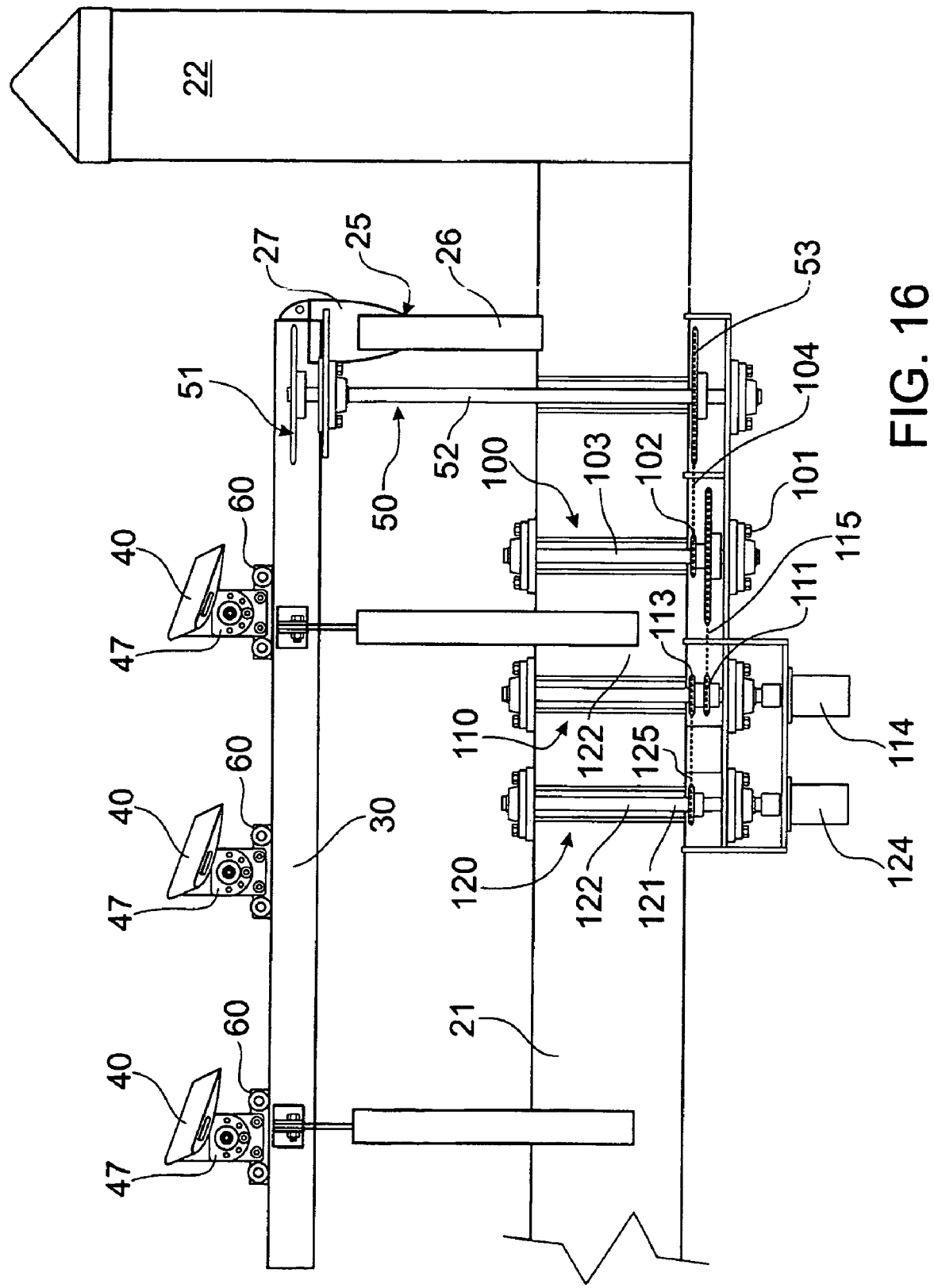
FIG. 16 shows a detailed sectional view of the power take off of the underwater power generation system.

The power take-off 50 shown in FIGS. 15 and 16 includes a main gear 51 mounted to a main gear shaft 52. The main gear shaft 52 is mounted via the track 30 and the main cylindrical body 21. The main gear shaft 52 is mounted adjacent the middle of the arcuate section of the track. The main gear 51 engages the drive chain 74 and is driven by the drive chain 74 as the foil carriage assembly 60 moves around the track 30. The power take-off 50 also includes a bottom gear 53 which is attached to the opposite end of the main gear shaft 52 to that of the main gear 81. The bottom gear 53 is located within the centre fin 23

A speed increase assembly 100 is located adjacent the power take-off. The speed increase assembly 100 includes a speed increase large gear 101 and a speed increase small gear 102, both of which are mounted to a speed increase shaft 103. The speed increase shaft 103 is mounted for rotation through the main cylindrical body 21. The speed increase gears 101 and 102 are located within the centre fin 23. The speed increase small gear 102 is substantially smaller than the bottom gear 53. The speed increase small gear 102 is connected to the bottom gear via a chain 104. The speed increase large gear 101 is the same size as the bottom gear.

Two pump assemblies 110 and 120 are located adjacent the speed increase assembly 100. Each pump assembly includes a respective pump gear 111 and 121 mounted to a respective pump shaft 112 and 122. Each respective pump shaft 112 and 122 is connected to and drives pumps 114 and 124. The first pump assembly 110 also includes a transfer gear 113 that is mounted to the pump shaft 112. The speed increase large gear 101 is connected to the first pump gear 111 via a chain 115. The transfer gear 113 is connected to the second pump gear 121 via a chain 125. Each pump is connected to a turbine (not shown).

The foils 40 are attached to the foil carriage assembly 60 using two foil attachment plates 47. The foils attachment plates 47 are connected to the foil connection plate 44 and the carriage connection plate 71. The angle of the foil 40 is able to be adjusted using the series of holes located in the foil connection plate 44. The angle of the foils is determined by numerous elements such as the velocity of the water and the direction of the water current.

In use, the underwater power generation system 10 is located within a water current so that the track 30 is substantially perpendicular to the water current. The water current acts on the foils 40 and cause the foils to drive the drive chain 74 around the track 30. The drive chain 74 in turn drives the main gear 51, main shaft 52 and bottom gear 53. The bottom gear 53 drives the speed increase large gear 101, speed increase small gear 102 and speed increase shaft 103. The rotational velocity of the speed increase large gear 101, speed increase small gear 102 and speed increase shaft 103 is substantially larger than that of the main gear 51, main shaft 52 and bottom gear 53.

The speed increase large gear 101 drives the first pump gear 111, first pump shaft 112 and transfer gear 113. The rotational velocity of the first pump gear 111, transfer gear 113 and first pump shaft 112 is substantially larger than that of the speed increase large gear 101, speed increase small gear 102 and speed increase shaft 103. The transfer gear drives the second pump gear 121 and second pump shaft 122. The pump shafts 112 and 122 drive their respective pumps 114 and 124 which provided pressurized water to drive a turbine to create electricity.

The side fins 24 can be adjusted so that the rotation of the track 30 by the foils 40 does not cause destabilization.

FIG. 18 shows a power generation system 201 according to one embodiment of the present invention. Power generation system 201 has an anchor 202, four cables 203, a support frame 204, four fins 205, a lower drive unit 207 and an upper drive unit 208.

Anchor 202 is securely attached to ocean floor 206. Preferably, anchor 202 is a rock anchor as is known in the art and hence anchor 202 is securely fastened to the ocean floor 206. Optionally, anchor 202 may be formed from concrete or a heavy metal such that the weight of anchor 202 securely locates anchor 202 in contact with the ocean floor 206.

Four cables 203 are securely attached to anchor 202 at one end as shown in FIG. 18. Cables 203 are free to swivel around anchor 202. Frame 204 is attached to each of cables 203 at an end distal to anchor 202. Frame 204 comprises two horizontal members 209 and two upright members 210. Each of cables 203 are attached at each intersection of horizontal members 209 and upright members 210 of frame 204.

Upper drive unit 208 and lower drive unit 207 are attached to frame 204 as shown. Fins 205 are attached to either end of upper drive unit 208.

Similarly, fins 205 are attached to either end of lower drive unit 207 as shown.

This will be discussed in more detail below.

Optionally, frame 204, upper drive unit 208 and lower drive unit 207 may be attached to cables on a boat, or be fixed to the floor of the ocean without being anchored by means of cables attached to an anchor. Alternatively, cables 203 may be attached to frame 204, upper drive unit 8 and lower drive unit 207 at one end and to a fixed structure, such as the pylons of the bridge or a pier, at the other end.

Figure 19:
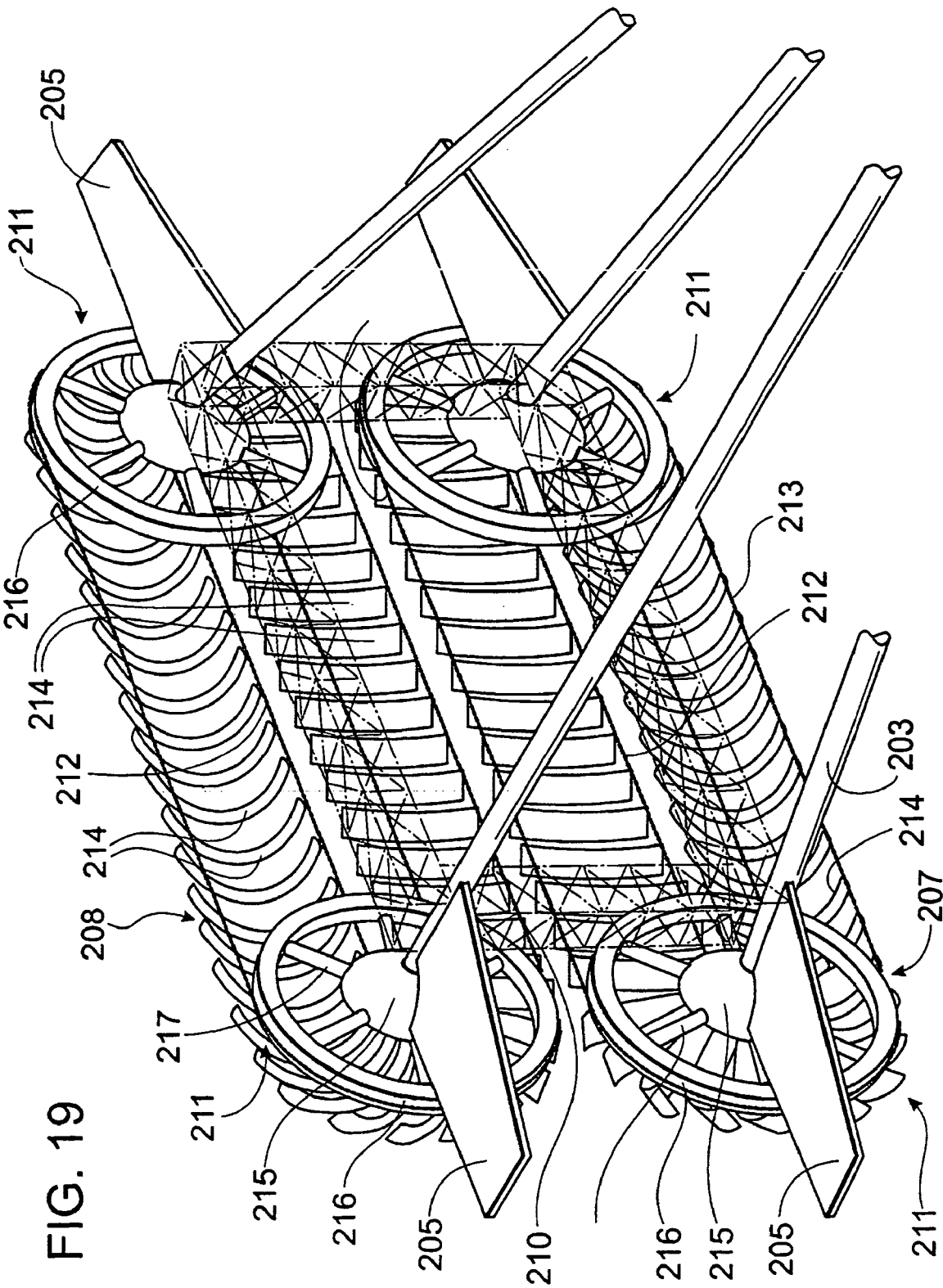
FIG. 19 shows a close up partial perspective view of two drive units forming part of the underwater power generation system of FIG. 18.

FIG. 19 shows a close up partial perspective view of upper drive unit 8 and lower drive unit 207. Upper drive unit 208 and lower drive unit 207 each have two power take offs in the form of circular structures 211, an inner guide cable 212, an outer guide cable 213 and a plurality of drag members in the form of foils 214.

Each circular structure 211 is rotatable and has a conical housing 215, a generator (not shown), an inner wheel (not shown), an outer wheel 216 and a plurality of spokes 217. The inner wheel (not shown) has its central axis at the central axle (not shown) of circular structure 211 and is rotatable. Outer wheel 216 is rotatable and is supported from the central axis of circular structure 211 via a plurality of spokes 217. Outer wheel 216 and inner wheel (not shown) rotate about the same central axle (not shown). A generator is operatively attached to the central axle (not shown) of circular structure 211. The generator converts the rotational energy of circular structure 211 into electrical energy and it will be appreciated that the generator has an electrical output cable attached thereto for transporting the electrical energy generated away from power generation system 201 to an area of use such as a remote oilrig or commercial electrical grid.

Conical housing 215 protects the generator and the generators subsequent electrical and/or mechanical components from damage. As can be seen in FIG. 19, an outer edge of conical housing 215 of each circular structure is securely attached to frame 204. Additionally, frame 204 ensures that circular structures 11 are spaced from each other in the configuration as shown without the distance between the circular structures 211 varying.

Referring to upper drive unit 28, an outer guide cable 213 encircles the pair of circular structures 211 that form part of upper drive unit 28. Outer guide cable 213 contacts the outer wheel 216 of each circular structure 211 as shown. Additionally, an inner guide cable 212 encircles inner wheels (not shown) of each pair of circular structures 211 that form part of upper drive unit 208.

A plurality of foils 214 form part of upper drive unit 208 and are attached to outer guide cable 213 at one end of each foil 214 and are releaseably attached to inner guide cable 212 at the other end of each foil 214.

Foils 214 are spaced evenly along outer guide cable 213 and inner guide cable 212 and are able to operatively turn outer wheels 216 and inner wheels (not shown) of each of the circular structures 211 that form part of upper drive unit 208.

It will be appreciated that lower drive unit 207 is structurally the same as upper drive unit 208.

Preferably, foils 214 are made from nylon and have a rigid bent rod (not shown) that ensures each foil 214 is correctly orientated as will be discussed below. Optionally, foils 214 may be made from a flexible material other than nylon such as a flexible plastic or the like. Alternatively, foils 214 may be made from a more rigid material such as fiberglass, plastic, a fiber composite or the like.

Figure 20:
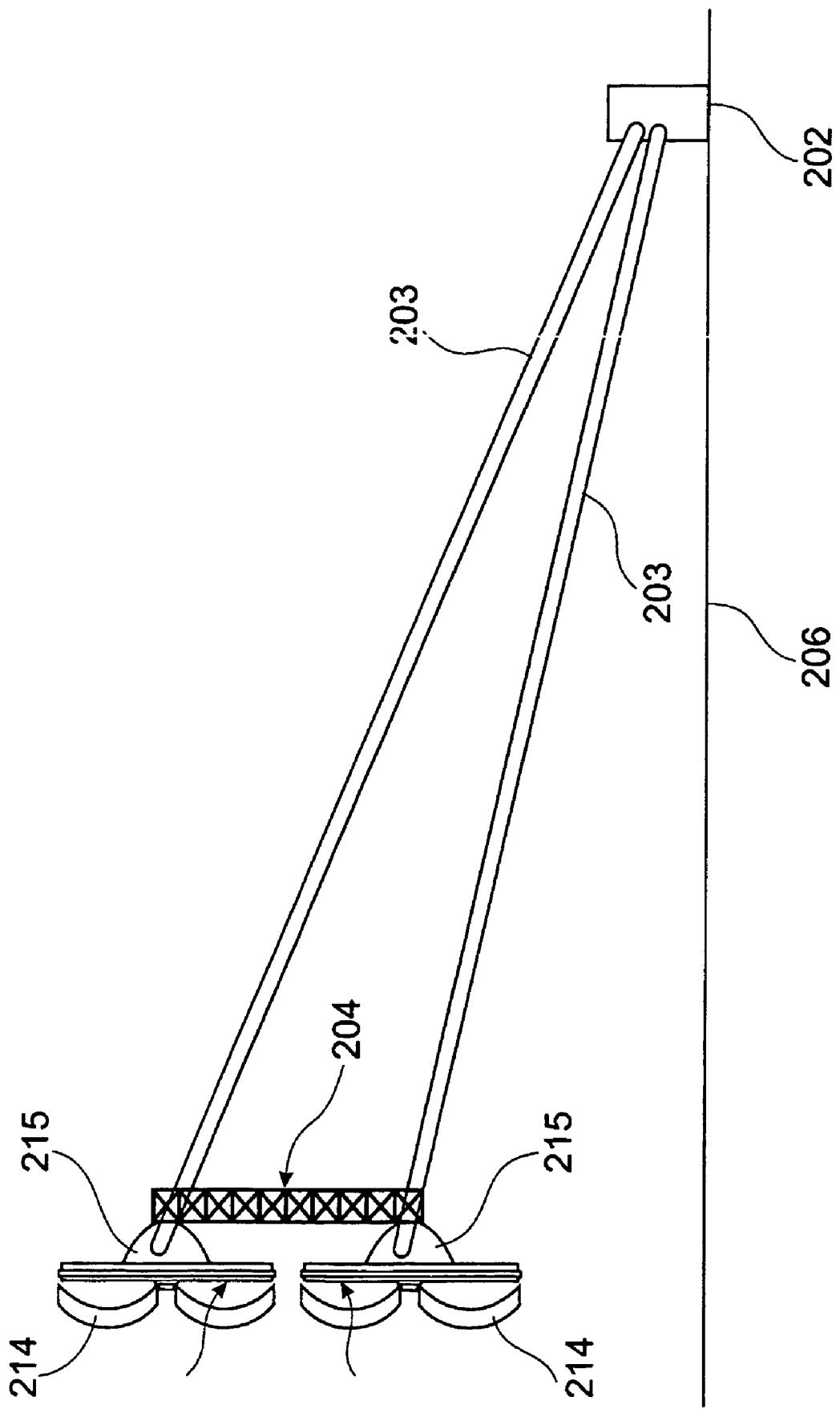
FIG. 20 shows a side view of the underwater power generation system of FIG. 18.

FIG. 20 shows a side view of power generation system 201. As can be seen, foils 214 protrude outwardly from upper drive device 208 and lower drive device 207 due to the pressure created by the flow of water in a direction perpendicular to the cross section of the drive devices. Not all foils 14 are shown in FIG. 18 and FIG. 20 but it will be appreciated that there will be four rows of foils, two for each drive device, as has been represented in FIG. 19.

In use, power generation system 201 is positioned in an area of the ocean where there are strong, constant currents. Optionally, power generation system 201 may be anchored to the bed of a river or other similar area of flowing water.

Power generation system 201 is positioned such that the flow of water is approximately perpendicular to the cross section of each upper drive unit 208 and lower drive unit 207 as shown in FIG. 18.

Foils 214 act as sails and the movement of water perpendicular to the cross section of each drive unit causes the foils 214 to move around each drive unit in a circular direction. Hence, the movement of foils 214 in a circular direction around each of upper drive unit 208 and lower drive unit 207 causes outer guide cable 213 and inner guide cable 212 of each drive device to rotate each circular structure 211. Additionally, this induces lift on upper drive structure 208, lower drive structure 207 and frame 208.

Importantly, the direction of rotation of the foils 214 in upper drive device 208 is opposite to that of foils 14 in lower drive device 207. For example, if foils 214 are rotating in a clockwise direction around upper drive device 8 then foils 214 in lower drive device 207 rotate in an anti-clockwise direction. This counter-directional rotational movement of the foils 214 on upper drive device 208 compared with the foils 214 on lower drive device 207 balances the rotational forces applied to power generation system 201 as a whole and ensures that power generation system 201 remains orientated correctly as shown. Additionally, fins 205 assist in maintaining the stability of upper drive unit 208, lower drive unit 207 and frame 204. Furthermore, fins 205 assist in providing lift to upper drive unit 208, lower drive unit 207 and frame 204.

If, for example, foils 214 on upper drive unit 208 and lower drive unit 207 both rotated in a clockwise direction then there would be a net clockwise rotational force applied to power generation system 201 causing the entire system to rotate. Therefore, each foil 214 has a rod (not shown) to ensure that the foils are correctly aligned such that they move around the drive devices in the desired direction. This rod acts much like a boom on a sailing vessel.

As previously mentioned, foils 214 may be made from a more rigid material and hence would be orientated such that the correct rotation is induced in upper drive unit 208 and lower drive unit 207.

As the end of foils 214 releaseably attached to inner guide cable 212 come into contact with inner wheel (not shown) of circular structure 211 the foils detach from inner guide cable 212. Importantly, the end of each foil 214 securely attached to outer guide cable 213 remains attached. Hence, as each foil 214 rotates around said circular structure 211, the end of foil 214 attached to outer guide cable 213 remains attached and the end attached to inner guide cable 212 detaches and reattaches shortly before foil 214 travels away from each circular structure 211.

Preferably, the detachment and re-attachment of each foil 214 from inner guide cable 212 is facilitated by a chain driven mechanical drive device that transports the detached end of foil 214 from the point of detachment to the point of re-attachment.

As previously mentioned a generator (not shown) is located within the conical housing 215 of each circular structure 211 and is operatively attached to outer wheel 216 and inner wheel (not shown). Each generator converts the rotational energy of each circular structure 211 to electrical energy as is known in the art. Hence, the movement of foils 214 due to flow of water perpendicular to the cross section of each upper drive device 208 and lower drive device 207 causes an operative rotation of inner wheel (not shown) and outer wheel 216 of each circular structure 211 and the generator (not shown) in each circular structure 211 converts this rotational energy to electrical energy.

It will be appreciated that each electrical generator will have an outlet and will be electrically attached to an area at which the electrical energy created by power generation system 201 will be used. Such areas may include remote oilrigs or commercial power grids.

Optionally, another pair of drive devices, securely fastened to anchor 202 via additional cables 203, may form part of power generation system 201. This pair of devices may be located above, below or to either side of the two drive devices described herein.

It will be appreciated that a plurality of power generation systems 201 may be assembled with each power generation system 201 being in close proximity with each other. Additional power generation systems 201 may be added to the farm as electrical demand increases.

Figure 21:
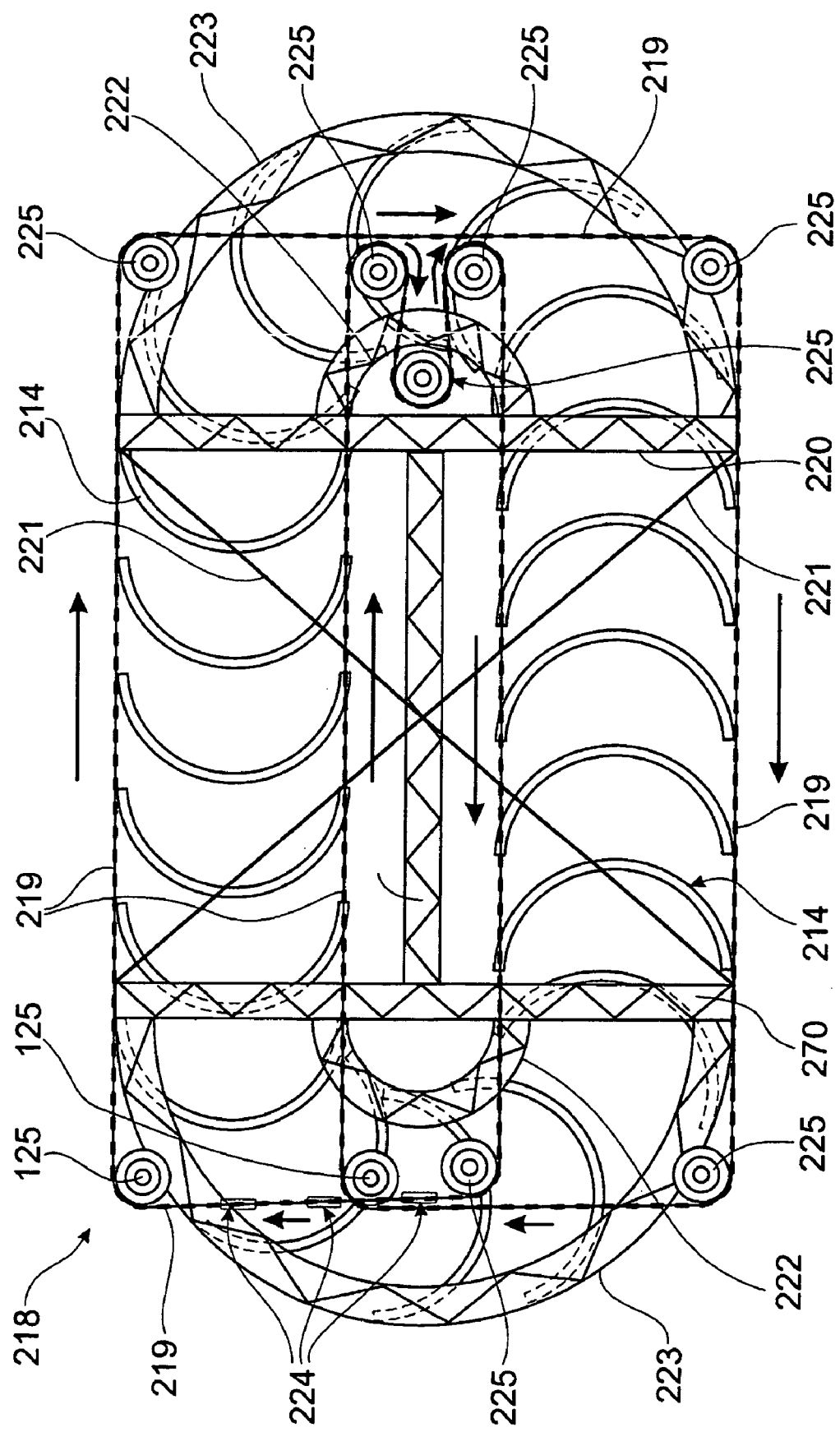
FIG. 21 shows a plan view of a drive unit of an underwater power generation system according to a second embodiment of the present invention.

FIG. 21 shows a drive unit 218 as an alternative to the upper drive unit 208 and the lower drive unit 207 described above. Drive unit 218 has a plurality of foils 214, a frame 220, inner guide tracks 222 and outer guide tracks 223.

Frame 220 is a truss-like frame formed from a plurality of members. The function of frame 220 is to offer support to drive unit 218 and ensure that its structural integrity remains intact. As such, a skilled person will appreciate that there may be structural variations from frame 220 that serve the same purpose.

Two support cables 221 are attached to frame 20 and offer additional support to drive unit 218.

An inner guide track 222 and an outer guide track 223 are located at either end of the frame 220. These guide tracks are semi circular in structure and are located such that both inner guide track 22 and outer guide track 23 have the same center point. A transport device (not shown) is located upon each of inner guide track 222 and outer guide track 223 and defines a semi circular path around each guide track.

A plurality of power take-offs comprise part of drive unit 218 in the form of pulleys 225 rotatably mounted on frame 220. While the mountings are not shown in FIG. 21, a person skilled in the art will appreciate that pulleys 225 will are mounted by means of an arm, truss, protrusion or similar such extension from frame 220.

A generator (not shown) is attached to each of drive pulleys 225 and each generator is able to convert rotational energy to electrical energy. It will be appreciated that each generator will be electrically linked to a power grid.

A guide cable 219 extends around pulleys 225 in a single, unbroken path and is moveable along this path. Guide cable 219 contacts each of pulleys 225 and is held in place due to the force provided by the tension of guide cable 19 exerted upon the outer surface of pulleys 225. Pulley 225 is moveably mounted on frame 220 and is biased so as to retain a constant tension within guide cable 219.

Three cable alignment idlers 224 contact guide cable 219 and are located upon frame 220 between pulley 233 and pulley 226. Cable alignment idlers 224 displace guide cable 219 such that is able to pass over drive pulley 230 and then back down again so that it may contact drive pulley 226.

A plurality of foils 214 are releaseably attached to guide cable 219 at either end of each foil 214. An attachment device (not shown) is located at either end of each foil 214.

The function of drive unit 218 is the same as upper drive unit 28 and lower drive unit 27 described above in that the movement of water past foils 214 causes the foils 214 to move which causes guide cable 219 to move in a fixed path.

Foils 214 move in a straight path between the inner and outer guide tracks located at either end of drive unit 218. While foils 214 are moving in this straight path they are attached to guide cable 219 by means of attachment device (not shown). However, the attachment device (not shown) located at each end of each foil 214 detaches from guide cable 219 prior to foils 214 undertaking the semi-circular path defined by the inner and outer guide tracks located at either end of the drive unit 218.

When foils 214 are moving in the semi-circular path around the inner and outer guide tracks at either end of the drive unit 218 the attachment device (not shown) is moved by the transport device (not shown) located on each inner guide track 222 and outer guide track 223. Upon completion of this semi-circular path the attachment device (not shown) detaches from the transport device and reattaches to guide cable 219. Hence, each foil 214 is again securely attached to the guide cable 219 at either end of the foil 214. In this way, foils 214 move in an oval path around drive unit 218.

It will be appreciated that the transport device (not shown) may be a chain drive mechanical device that moves the attachment devices, and hence the foils 214, around the inner and outer guide tracks when the foils 214 are detached from the guide cable 219. Alternatively, transport device may be comprised of a series of wheels or may be a conveyor belt type device.

The attachment device (not shown) located at either end of foil 214 is of a form similar to that found on ski-lift chairlifts. This device has a releasable clamping means for attaching and detaching from the guide cable 219 and a method of moving between a clamped position for attachment to the guide cable and an opened position for releasing the attachment means, and hence the foil 214, from the guide cable 219.

Similar to lower drive unit 207 and upper drive unit 208 described above, the foils 214 of dive unit 218 are aligned to harness the power of the moving water of, preferably, an ocean current. This moving water causes the foils 214 to induce movement of guide cable 219. The movement of guide cable 219 causes rotation of pulleys 225 and this rotation is converted to electrical energy by the generators (not shown) attached to these pulleys.

It will be appreciated that drive unit 218 may replace lower drive unit 207 and upper drive unit 208 in power generation system 201 and as such may be secured to the sea floor or bridge pylon in the same way. Additionally, a plurality of drive units 218 may be arranged in a farm in the same way.

Figure 22:
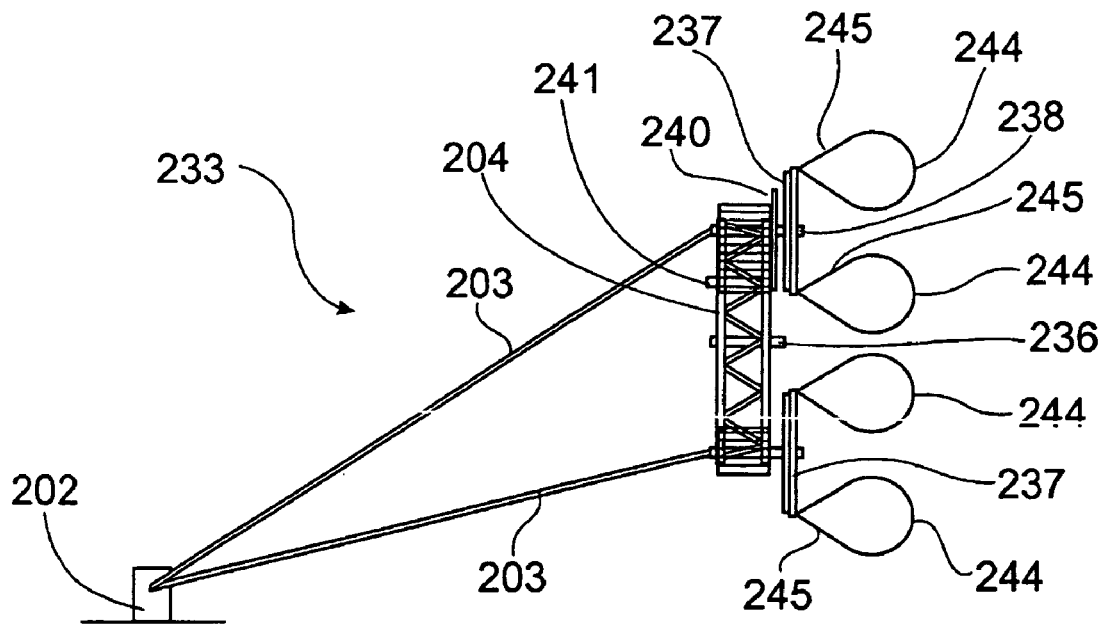
FIG. 22 shows a side view of an underwater power generation system according to a third embodiment of the present invention.
Figure 23:
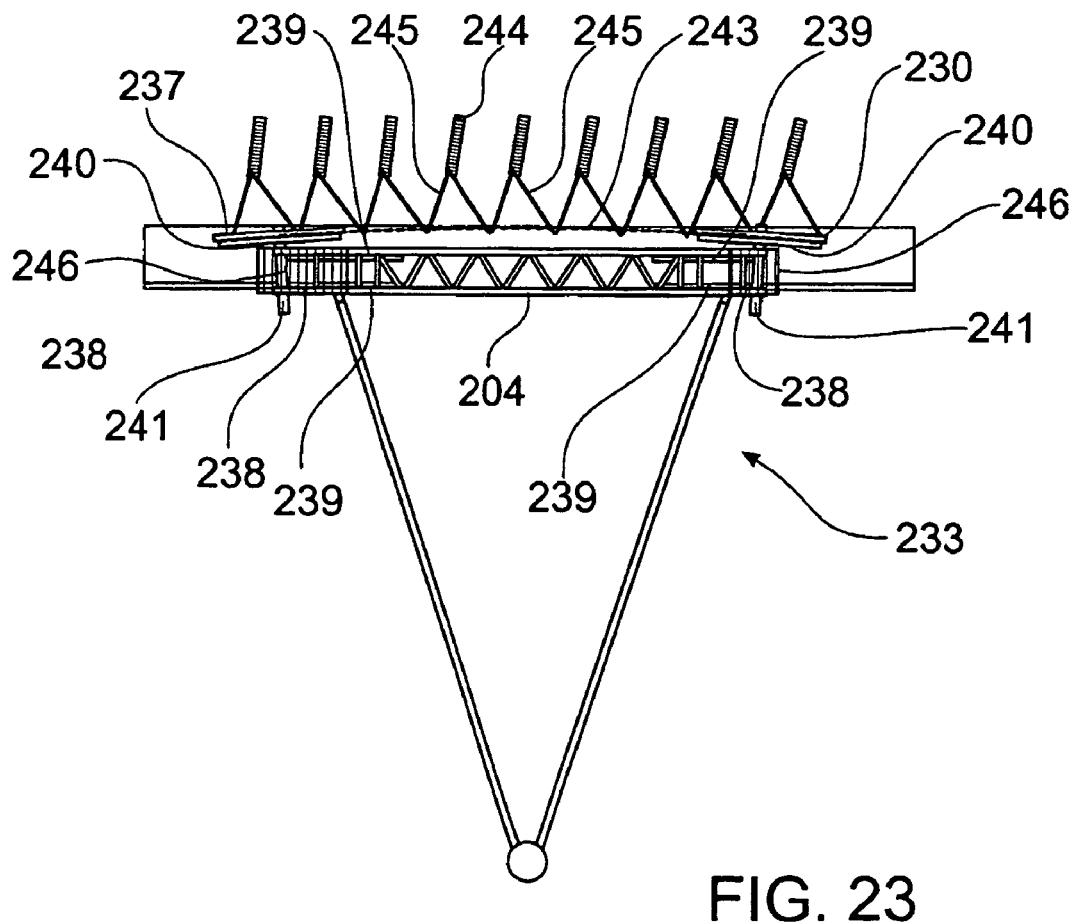
FIG. 23 shows a plan view of the underwater power generation system of FIG. 23.
Figure 24:
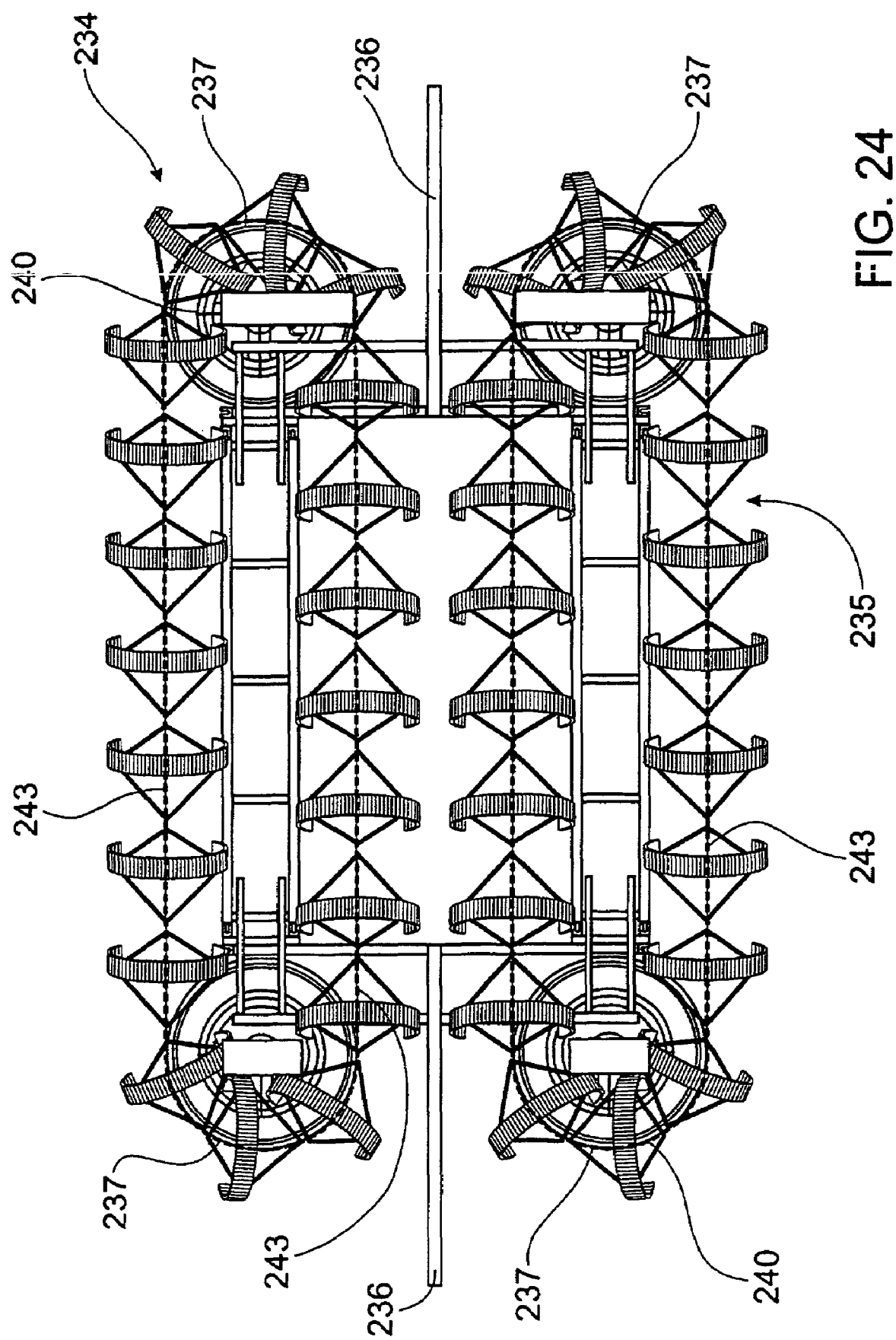
FIG. 24 shows a front view of two drive units forming part of the underwater power generation system of FIG. 23.

FIG. 22 and FIG. 23 show an underwater power generation system 233 according to a further embodiment of the present invention. FIG. 23 shows an upper drive unit 234 and lower drive unit 235 which together form part of power generation system 233.

Similar to previous embodiments described above, power generation system 233 has an anchor 202 securely attached to the ocean floor.

Power generation system 233 further comprises four cables 203, a frame 204, an upper drive unit 234 and a lower drive unit 235. Cables 203 are fastened to anchor 2022 at one end of each cable 203 and operatively attached to frame 204 at the opposite end of each cable 203. Upper drive unit 234 and lower drive unit 235 are mounted on frame 204. Additionally, a fin 236 is mounted on frame 204 at either end as shown to help stabilize frame 203 and drive units 232 and 235.

A power take off in the form of a rotatable drive pulley 237 is located at either end of upper drive unit 234. A drive shaft 238 extends from a central portion of each drive pulley 237 with each drive shaft 238 being rotatable with drive pulley 237. An adjustment device is mounted on either end of frame 203 adjacent each drive pulley 237 and operatively attaches each drive pulley 237 to frame 204. Preferably, the adjustment device is in the form of two extendable arms 239. On end of each extendable arm 239 is securely fastened to frame 204 and the opposite end of each arm 239 is fastened to drive shaft 238 such that shaft 238 is still able to rotate.

Extendable arms 238 are telescopic such that they can alter the angle of each drive shaft 238 with respect to frame 204 and hence operatively alter the angle of drive pulleys 237.

A sprocket 240 is attached to one drive shaft 238 between drive pulley 27 and frame 202. Sprocket 240 is rotatable with drive shaft 238 and is in mechanical communication with a pump 241 via drive chain 242 and pump shaft 246. Pump 241 has an open intake aperture that allows water to flow within pump 241. Additionally, pump 241 has a high pressure outlet aperture.

Attached to the outlet aperture of pump 241 is a hose (not shown) for communicating water under pressure away from power generation system 233 as will be discussed in more detail later.

Optionally, the sprocket and pump arrangement described above may be present at both drive pulleys 237 of upper drive unit 234.

A drive cable 243 encircles drive pulleys 237 of upper drive unit 234. A plurality of drag members in the form of foils 244 are operatively attached at spaced intervals along the length of drive cable 243.

Figure 25:
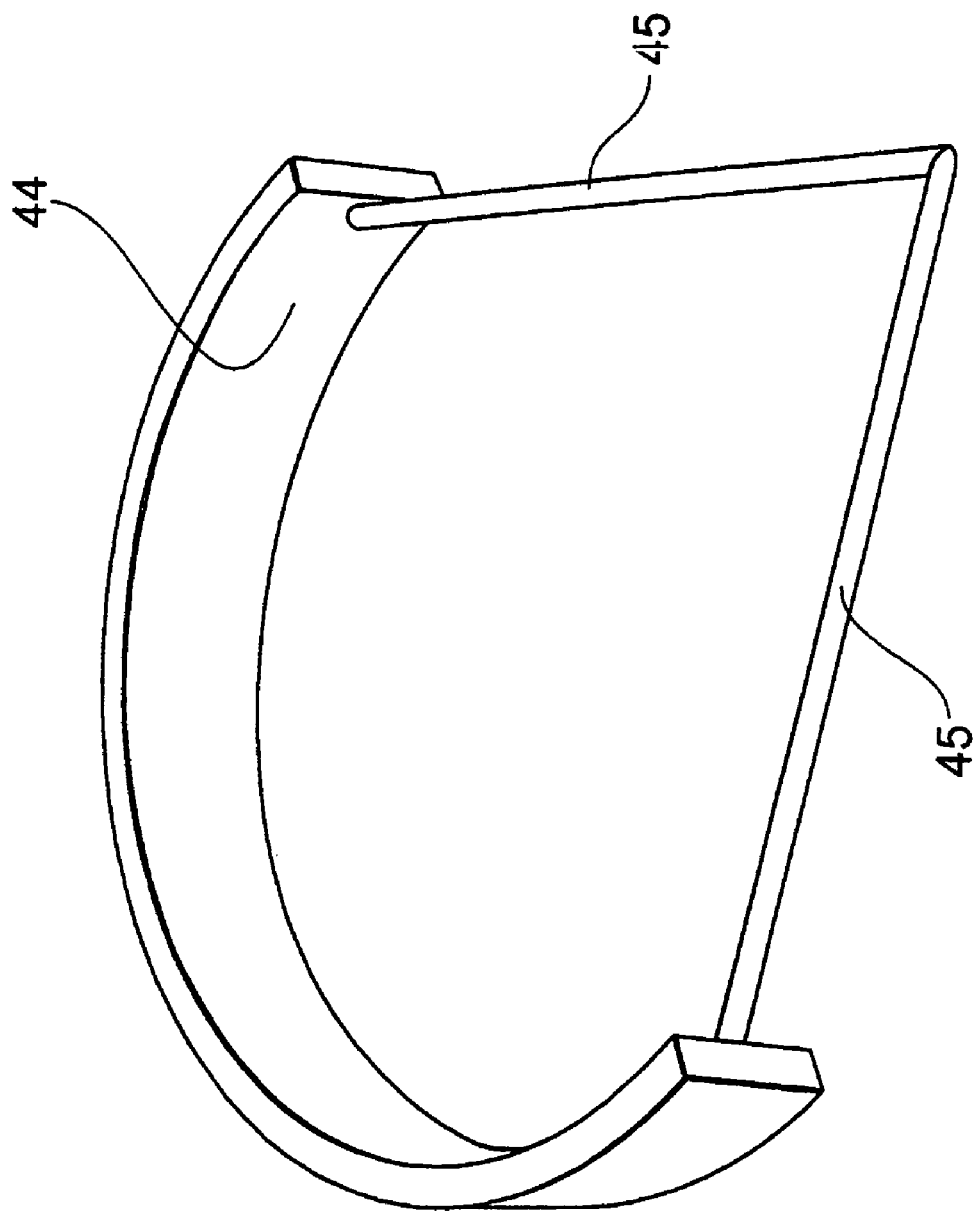
FIG. 25 shows an foil that forms part of the underwater power generation system of FIG. 23.

FIG. 25 shows a perspective view of a foil 244 that forms part of power generation system 233. Foil 244 is a rectangular member that is deformed into a semi-circular shape. Foil 244 is formed from a rigid material such as aluminum, fiberglass or the like. A plurality of attachment arms 245 are used to connect foil 244 to drive cable 243. Each attachment arm 245 is securely fastened to an end of a foil 244 at one end of the arm 245 and is securely fastened to drive cable 243 at the other end of the arm 245. In FIG. 25 foil 244 has two attachment arms that are attached to foil 244. However, as in FIG. 23, each foil 244 may have four attachment arms 245 attached.

Preferably, foils 244 are fixed to attachment arms 245. Optionally, foils 244 may be pivotal on support arms 244 to ensure that they are aligned optimally.

Lower drive unit 235 has similar features to upper drive unit 234 described above. However, as shown in FIG. 23, the pump and sprocket arrangement on lower drive unit 235 is located on the drive pulley 237 that is on an opposite side of frame 204 to the pump and sprocket arrangement on the drive pulley 237 of upper drive unit 235. Optionally, both drive pulleys 237 on upper drive unit 234 and lower drive unit 235 may have a sprocket and pump assembly fitted thereon.

In use, as in previous embodiments described above, power generation system 233 is immersed in a location of flowing water such as a river or within a constant ocean current. The flow of water causes foils 244 to move and hence operatively cause drive cable to rotate around their respective drive units in a fixed path. The movement of drive cables 243 causes a rotation of drive pulley's 237 and hence a rotation of each drive shaft 238. Hence, each sprocket 240 is rotated and operatively causes each pump 241 to draw in water adjacent the pumps inlet. This water is pressurized by each pump 241 and communicated under pressure via the pipe attached to the pumps outlet.

The pressurized water is transported to a land based power generation station that converts the mechanical energy of the pressurized water to electrical energy using methods well known in the art. Optionally, the pressurized water is communicated to an oilrig, boat or an enclosed pressurized housing on the seabed adjacent to power generation system 233 for conversion to electrical energy.

Figure 26:
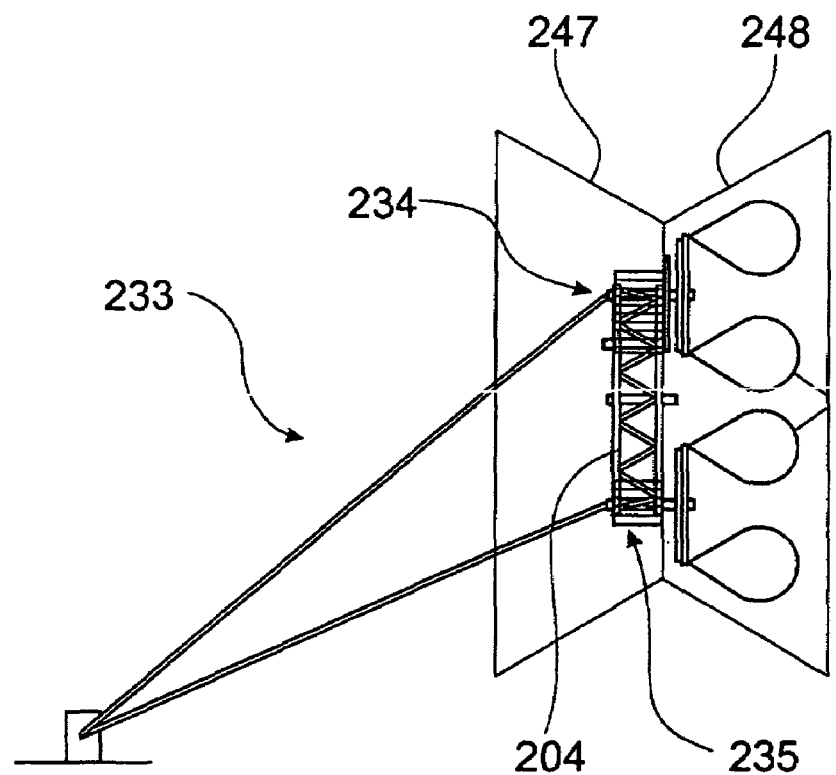
FIG. 26 shows a side view of the underwater power generation system shown in FIG. 23 having a rear funnel and forward funnel mounted thereon.
Figure 27:
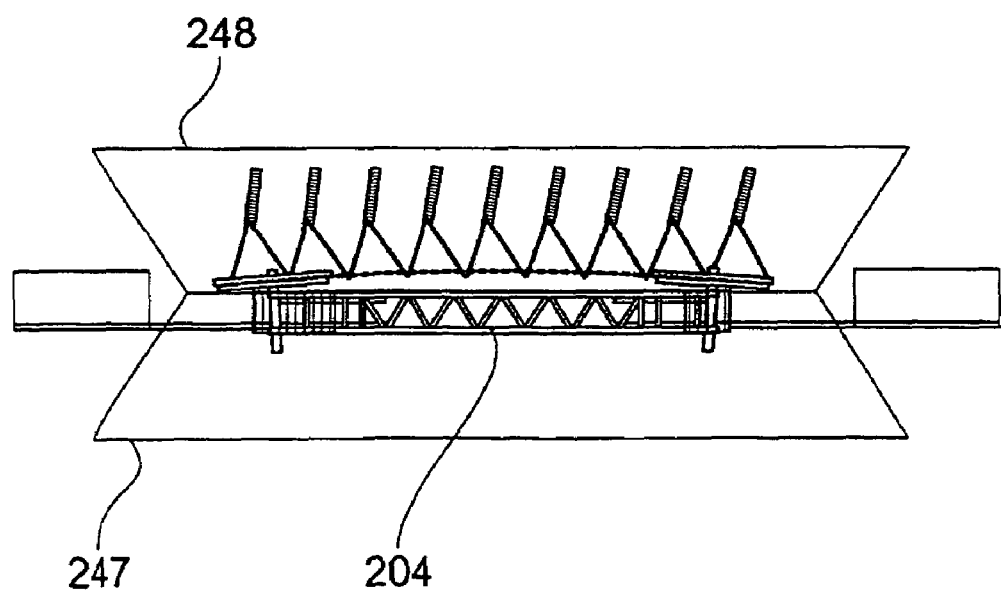
FIG. 27 shows a plan view of the underwater power generation system shown in FIG. 27.

FIG. 26 shows a side view power generation system 233 having a forward funnel 247 and a rear funnel 248 mounted thereon. FIG. 27 shows a plan view of power generation system 233 having forward funnel 247 and rear funnel 248 mounted thereon. Forward funnel 247 is located on an upstream side of frame 2. Similarly, rear funnel 248 is located on a downstream side of frame 2. Preferably, rear funnel 248 and forward funnel 247 are mounted on frame 2.

Forward funnel 247 and rear funnel 248 act together to harness the flow of water to increase the velocity of the water in the vicinity of the drive units.

This increase in water velocity results in a more effective generation system.

In power generation system 233 the creation of electrical energy takes place at a point remote from the power generation system 233. As such, power generation system 233 will have low maintenance costs due to the fact that the electrical conversion devices, such as generators, are not located underwater.

Similar to previous embodiments, a plurality of drive units may be arranged in a farm to increase the capacity of electrical energy generation.

Figure 28:
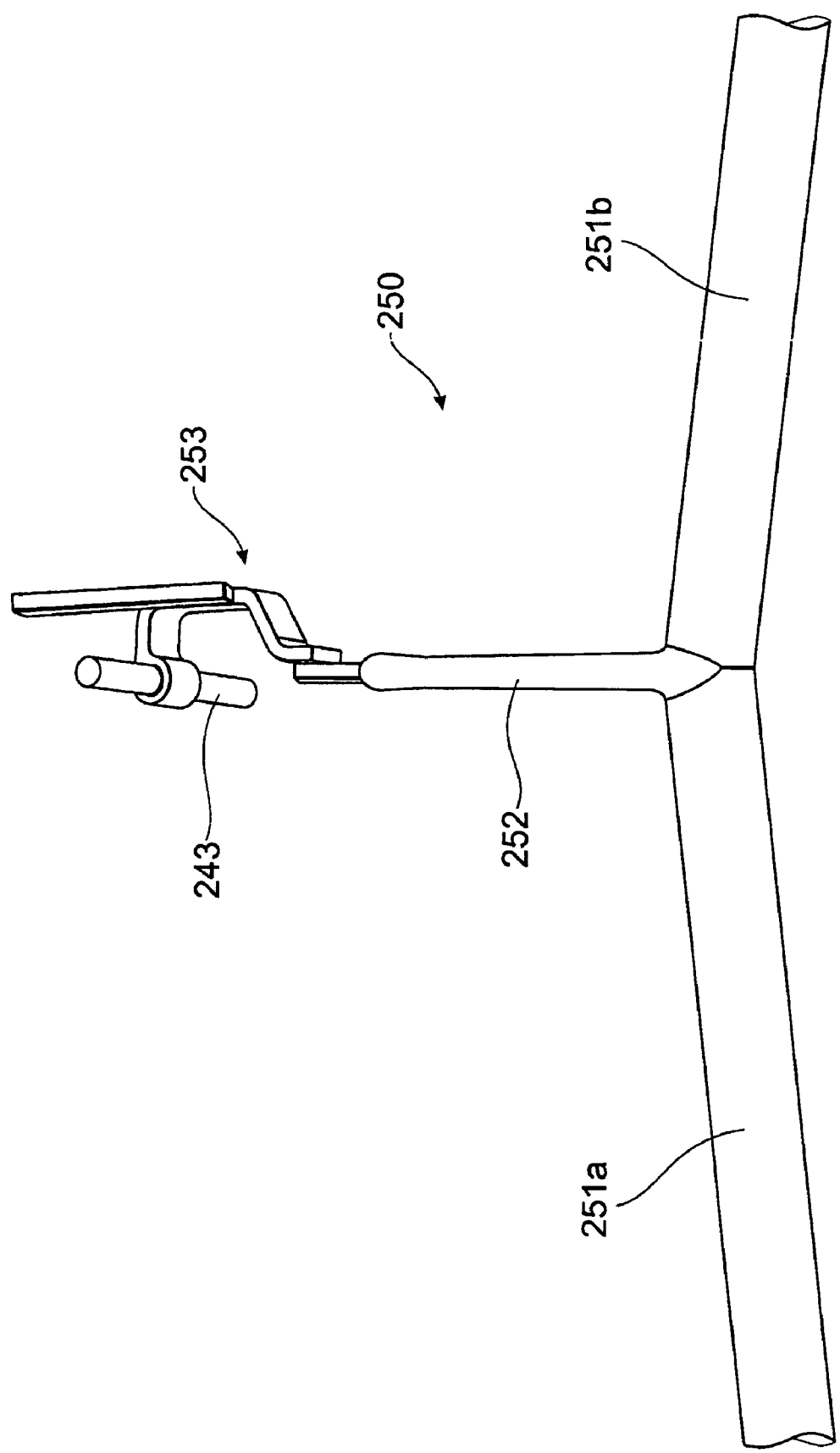
FIG. 28 shows a perspective view of a further embodiment of the foil shown in FIG. 26.
Figure 29:
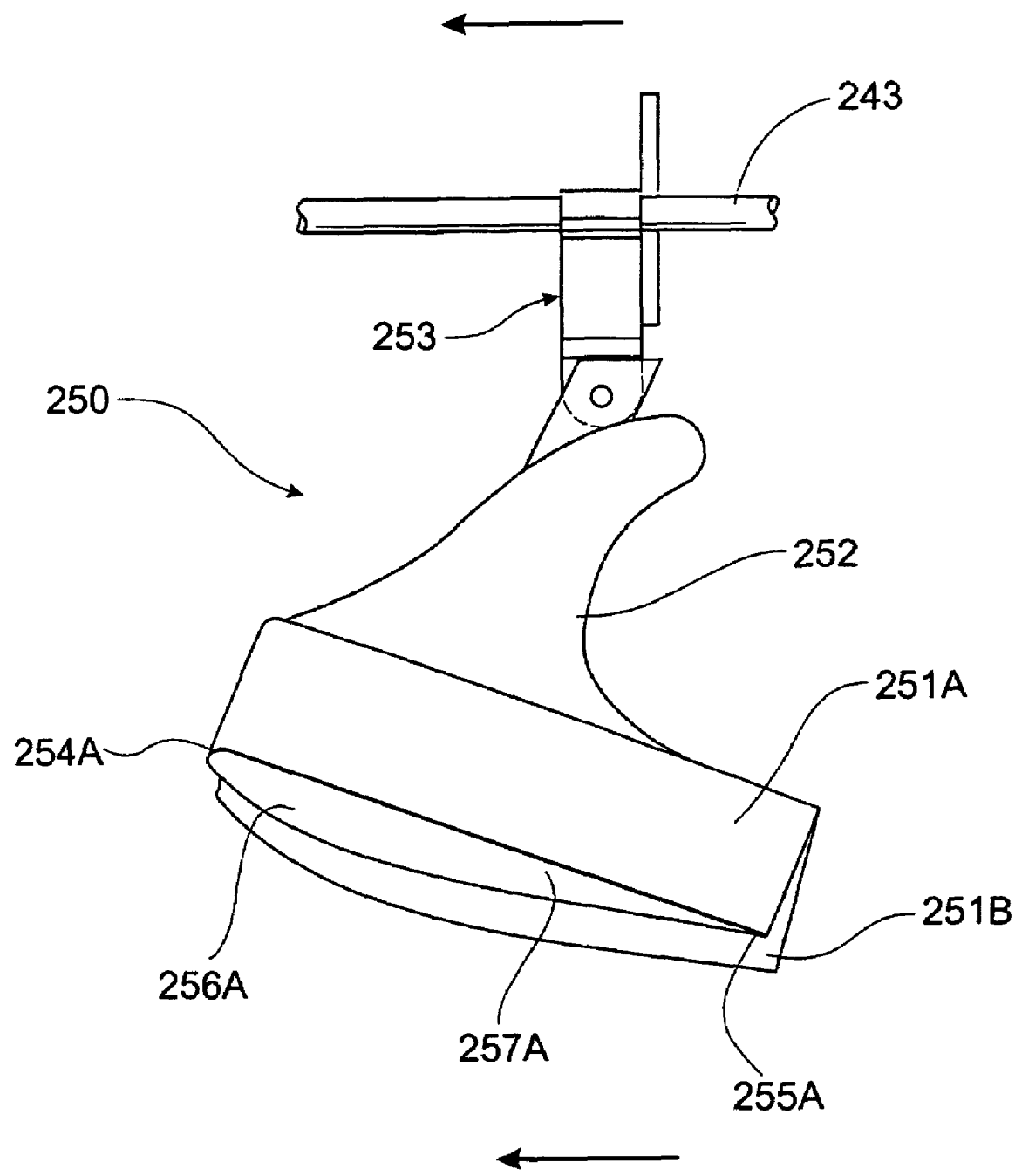
FIG. 29 shows a top perspective view of the foil shown in FIG. 26.
Figure 30:
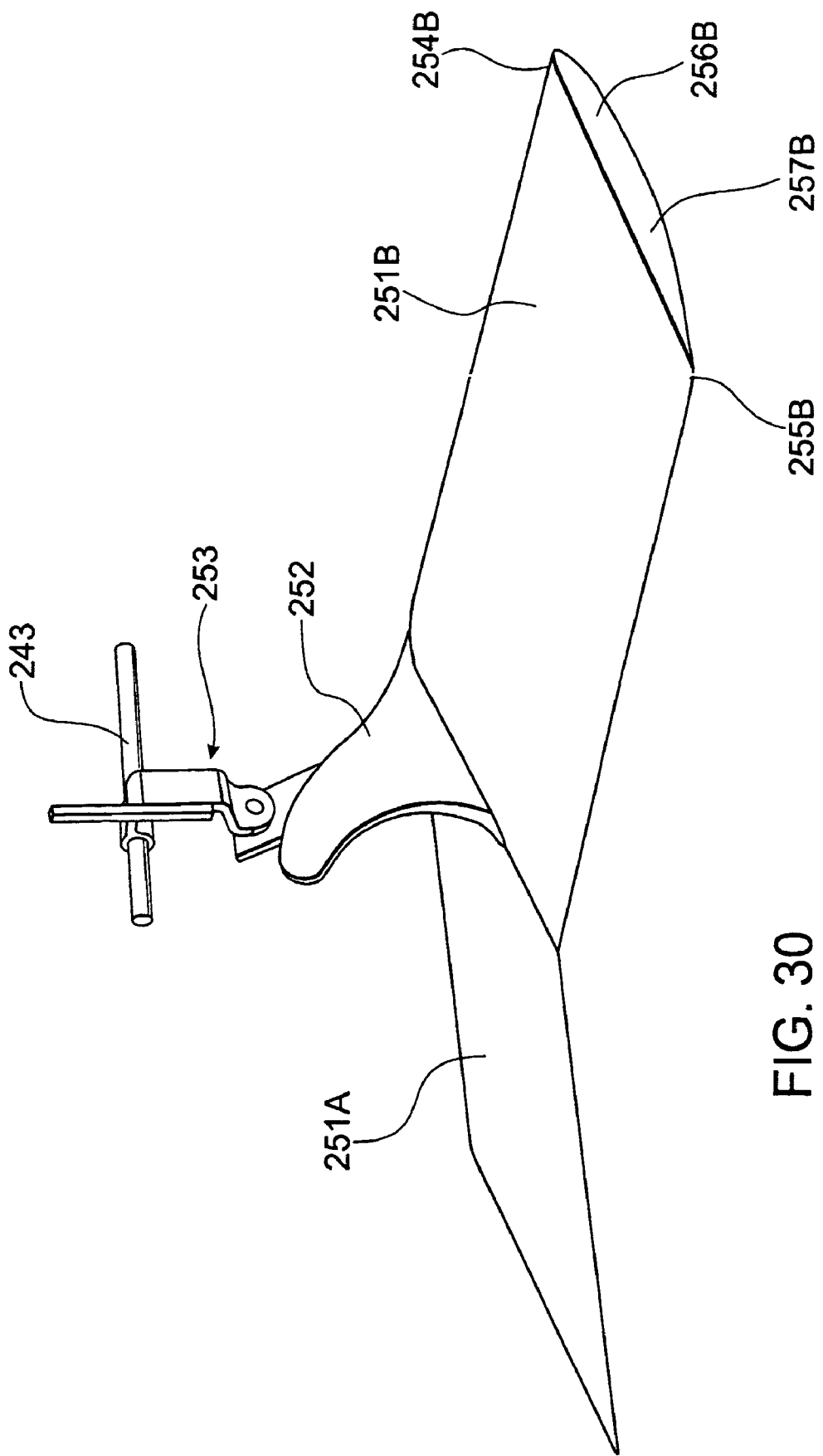
FIG. 30 shows a further perspective view of the foil shown in FIG. 26.

FIGS. 28-30 show perspective views of a second embodiment of foils 244 in the form of foil 250. Foil 250 forms part of power generation system 233 as a drag member. Foil 250 has a pair of wings 251A and 251B, a stabilization fin 252 and an attachment member 253.

Wings 251A and 251B are formed at an angle to one another as shown. Stabilization fin 252 extends from the intersection of wings 251A and 251B. Preferably, wings 251A and 251B and stabilization fin 252 are integrally formed. Alternatively, wings 251A and 251B are formed separately from stabilization fin 252 with stabilization fin 252 being securely fastened at the intersection of wings 251A and 251B.

Wings 251A and 251B and stabilization fin 252 are formed from a lightweight rigid material such as fiberglass, plastic or the like.

Referring particularly to FIGS. 28 and 29 it can be seen that each of wings 251A and 251B have a tapered cross-section. Wing 251A has a leading front edge 254A, a trailing edge 255A, a bulbous nose portion 256A and a thin tail portion 257A. The cross section of wing 251A is largest at bulbous nose portion 256A and tapers through thin tail portion 257A to a minimum at trailing edge 255A. The cross section of wing 251B is identical to that of wing 251A described above.

Attachment member 253 extends from stabilization fin 252 at an end distal from wings 251A and 251B. As shown, attachment member 253 securely fastens foil 250 to drive cable 243 of power generation system 233.

Figure 31:
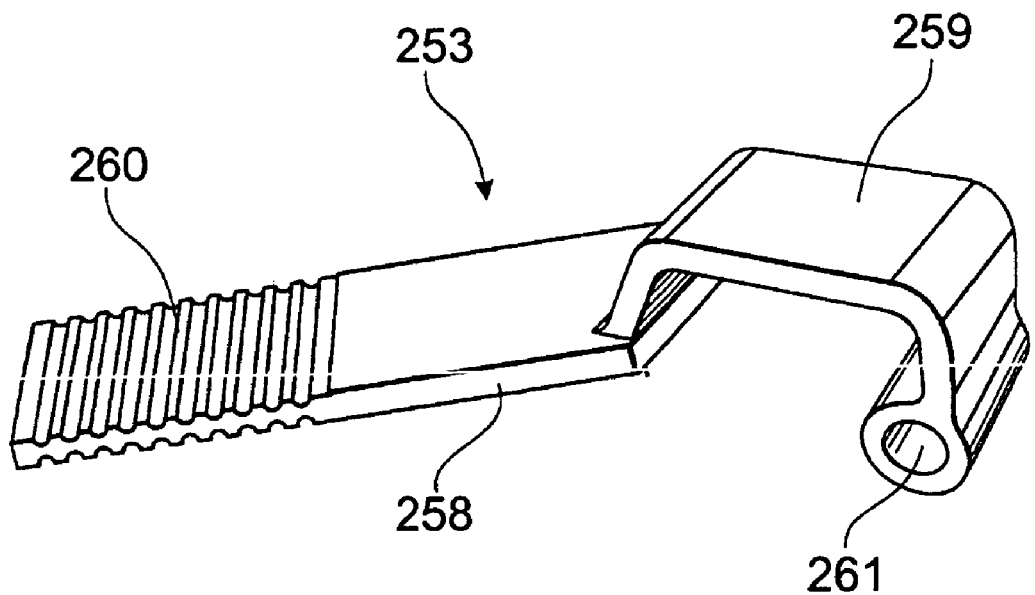
FIG. 31 shows a perspective view of an attachment member forming part of the foil shown in FIG. 26.
Figure 32:
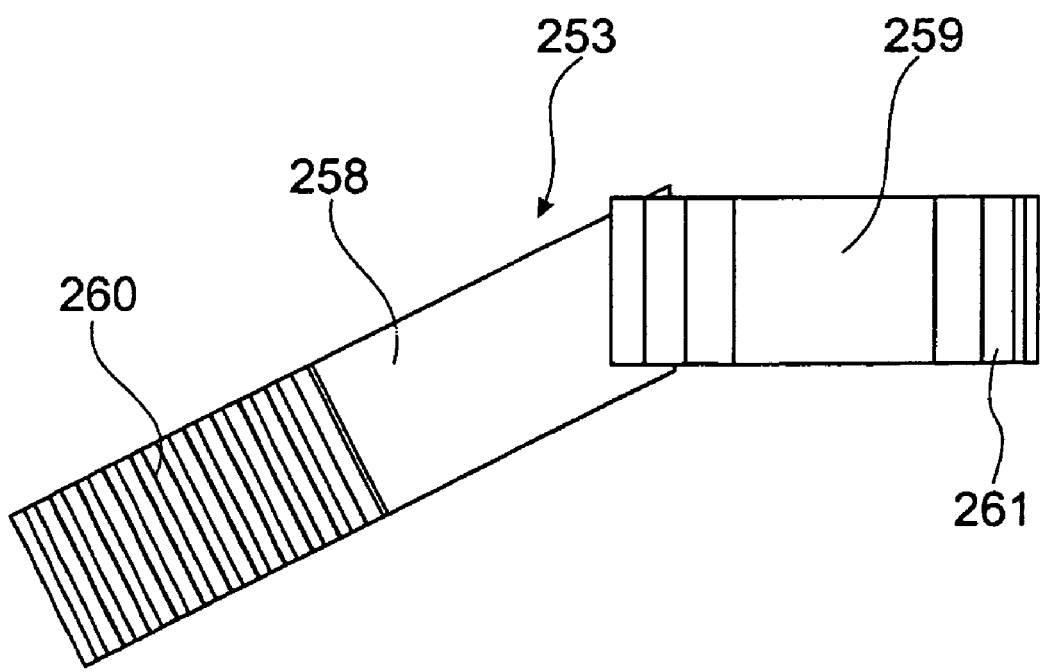
FIG. 32 shows a top sectional view of the attachment member shown in FIG. 32.

FIGS. 31 and 32 show attachment member 253 in more detail.

Attachment member 243 comprises a straight section 258 and a U-shaped section 259. A corrugated portion 260 is formed at one extent of straight section 258. Corrugated portion 260 is located within stabilization fin 252 and helps securely attach straight section 258 thereto. Preferably, stabilization fin 252 is formed around corrugated portion 260 of straight section 258. Alternatively, corrugated portion 260 of straight section 258 is located within stabilization fin 252 after stabilization fin 252 has been formed.

U-shaped section 259 extends from an end of straight section 258 distal from corrugated portion 260. U-shaped section 259 is welded to straight section 258. Optionally, U-shaped section 259 may be fastened to straight section 258 by chemical fasteners, such as glue, or by means of mechanical fasteners, such as rivets, bolts of the like. Alternatively, U-shaped section 259 is integrally formed with straight section 258.

As shown in FIG. 32, straight section 258 is at an angle to U-shaped section 59 such that the two-sections are not parallel.

An aperture 261 is located on U-section 259 at an end distal from straight section 58. Drive cable 243 of power generation system 233 passes through aperture 261 such that attachment member 253 is not moveable along drive cable 243. Hence, a portion of drive cable 243 is non-slideably secured within aperture 261 of attachment member 253.

As previously described, a plurality of foils 250 are located at spaced intervals along each of drive cables 243 on lower drive unit 235 and upper drive unit 234 of underwater power generation system 233. Foils 250 are angled such that they harness the kinetic energy of moving water.

Foils 50 move around the drive units in a direction indicated by the arrows in FIG. 29. The profiled cross section of the wing members ensures that the foils 50 efficiently harness the kinetic energy of the moving water.

It will be appreciated that foil 250 may be used as a drag member in any underwater power generation system that harnesses the kinetic energy of moving water.

The underwater power generation systems detailed above are environmentally friendly as they use natural water current to create electricity without the creation of any pollution. The electricity produced is a renewal energy source as water currents such as those found in rivers, in the ocean and created by the tides occur frequently.

The underwater power generation systems all have at least one line member that runs along a defined pathway. The pathway is located in a single plane. The underwater power generation system is positioned so that the plane and hence the pathway is located perpendicularly to the flow of the water current. Hence, less turbulence is created as the foils are propelled by the water at the same instant resulting in increased efficiency. A further advantage of the pathway being perpendicular to the flow of water current is that the foils always provide a drive to the line member as the pass along the entire pathway.

It should be appreciated that various changes and modification may be made to the embodiment described without departing from the spirit or scope of the invention.

What is claimed is:

1. A power generation system adapted to provide power output from water flow, the system comprising:
   a frame;
   a plurality of carriages linked in series along a pathway, the pathway lying substantially in a plane;
   a track supporting the carriages and being attached to the frame, wherein the track comprises a rectangular channel having opposing side track plates and a bottom track plate, and wherein the carriage comprises a body, a first wheel assembly having a pair of wheels, each wheel adapted to roll along an edge of one of the side track plates and a second wheel assembly having a wheel adapted to roll along an inner surface of one of the side track plates;
   a plurality of foils, each mounted on one of the plurality of carriages, wherein the foils are adapted to propel the carriages along the pathway in response to water flow acting on the foils in a direction substantially perpendicular to the plane, wherein each of the foils is formed from two splayed wings and a connection arm; and
   a power take-off operatively adapted to extract power from the movement of the carriages along the pathway.

2. The power generation system of claim 1, further comprising a drive chain connecting the plurality of carriages and operatively associating the carriages with the pox or take-off.

3. The power generation system of claim 1, wherein the channel further comprises a lubricating strip arranged on one of the side track plates adjacent the wheel of the second wheel assembly, the lubricating strip adapted to retain the wheel in the channel.

4. The power generation system of claim 3, wherein the wheels of the first wheel assembly are grooved so as to receive the edge of the side track plate.

5. The power generation system of claim 4, wherein the carriage comprises two of the first wheel assemblies and two of the second wheel assemblies.

6. The power generation system of claim 1, further comprising an anchor for mounting the system on an ocean floor or river bed.

7. The power generation system of claim 6, wherein the frame comprises a main cylindrical body with two arcuate attachment anns, the attachment arms mounted to the anchor.

8. The power generation system of claim 7, wherein the frame further comprises a plurality of track support members extending from the cylindrical body, the track support members supporting the track.

9. The power generation system of claim 1, wherein the pathway is generally obround in shape.

10. The power generation system of claim 1, wherein the power take-off is operatively associated with a generator for producing electricity.

11. The power generation system of claim 1, wherein the power take-off is operatively associated with a pump for pumping water.

12. A device for power generation comprising a first and second power generation system of claim 1, the first power generation system mounted adjacent to the second power generation system, wherein foils of the first power generation system rotate in a direction opposite to rotation of the foils of the second power generation system in response to substantially perpendicular water flow to the respective power generation system.

13. The power generation system according to claim 1, wherein each carriage has a foil mounted thereon.

14. A method of generating power from water current comprising:
   (i) providing a power generation system comprising:
      a frame;
      a plurality of carriages linked in series along a pathway, the pathway lying substantially in a plane;
      a track supporting the carriages and being attached to the frame, wherein the track comprises a rectangular channel having opposing side track plates and a bottom track plate, wherein the carriages comprise a body, a first wheel assembly having a pair of wheels, each wheel adapted to roll along an edge of one of the side track plates and a second wheel assembly having a wheel adapted to roll along an inner surface of one of the side track plates;
      a plurality of foils, each mounted on one of the plurality of carriages, wherein the foils are adapted to propel the carriages along the pathway in response to water flow acting on the foils in a direction substantially perpendicular to the plane, wherein each of the foils is formed from two splayed wings and a connection arm; and
      a power take-off operatively adapted to extract power from the movement of the carriages along the pathway;
   (ii) arranging the power generation system in a water current, wherein the water flows in a direction substantially perpendicular to the plane;
   (iii) allowing the ater to flow through the power generation system to propel the carriages along the track; and
   (iv) extracting power from the power take-off.

15. The method of generating power according to claim 14, wherein the power generation system is arranged in an ocean.

16. The method of generating power according to claim 14, wherein the power generation system is arranged in a river.

17. The method of generating power according claim 14, wherein the power take-off is operatively associated with a generator for producing electricity.

18. The method of generating power according to claim 17, wherein the power take-off is operatively associated with a pump for pumping water.

19. The method of generating power according to claim 14, wherein each carriage has a foil mounted thereon.

* * * * *